(12) United States Patent
Miyasaka

(10) Patent No.: US 8,270,750 B2
(45) Date of Patent: Sep. 18, 2012

(54) IMAGE PROCESSOR, DISPLAY DEVICE, IMAGE PROCESSING METHOD, AND PROGRAM

(75) Inventor: Daigo Miyasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 12/281,299

(22) PCT Filed: Feb. 9, 2007

(86) PCT No.: PCT/JP2007/052320
§ 371 (c)(1),
(2), (4) Date: Aug. 29, 2008

(87) PCT Pub. No.: WO2007/099755
PCT Pub. Date: Sep. 7, 2007

(65) Prior Publication Data
US 2009/0016633 A1     Jan. 15, 2009

(30) Foreign Application Priority Data

Mar. 2, 2006   (JP) ................................ 2006-056215

(51) Int. Cl.
*G06K 9/40*   (2006.01)
(52) U.S. Cl. ......................... 382/255; 382/256; 345/698
(58) Field of Classification Search ........................ None
See application file for complete search history.

(56) References Cited

U.S. PATENT DOCUMENTS 5,894,329 A * 4/1999 Takeda et al. ................. 348/446
2005/0147317 A1 * 7/2005 Daly et al. ..................... 382/264
2006/0038826 A1 * 2/2006 Daly .............................. 345/598
2006/0233456 A1 * 10/2006 Ahn et al. ..................... 382/275
2006/0269159 A1 * 11/2006 Kim et al. ..................... 382/256

FOREIGN PATENT DOCUMENTS

| JP | 63-15576 A | | 1/1988 |
|---|---|---|---|
| JP | 4-165874 A | | 6/1992 |
| JP | 9-44128 A | | 2/1997 |
| JP | 9-107472 A | | 4/1997 |
| JP | 10-173488 A | | 6/1998 |
| JP | 2002-112038 A | | 4/2002 |
| JP | 2003-304399 | * | 2/2003 |
| JP | 2003-304400 A | | 10/2003 |
| JP | 2003-333348 A | | 11/2003 |
| JP | 2004-054210 A | | 2/2004 |
| JP | 2005-221593 A | | 8/2005 |
| JP | 2006-50358 A | | 2/2006 |

* cited by examiner

*Primary Examiner* — Jason M Repko
*Assistant Examiner* — Siamak Harandi
(74) *Attorney, Agent, or Firm* — Sughrue Mion, PLLC

(57) ABSTRACT

By sequentially scanning pixel lines of an image signal that has been received as input linear interpolation application regions, which are regions in which gray-level changes are to be smoothed, are detected for each line of the input signal, and the detected linear interpolation application regions are then subjected to an gray-level extension process. The regions that have been subjected to the gray-level extension process are further subjected to a process of limiting, to within prescribed values, gray-level changes in a second direction that differs from the direction in which the linear interpolation application region detection process was carried out.

17 Claims, 21 Drawing Sheets

IMAGE PROCESSOR, DISPLAY DEVICE, IMAGE PROCESSING METHOD, AND PROGRAM

TECHNICAL FIELD

The present invention relates to an image processor, a display device, an image processing method, and a program for carrying out a gray-level extension process of an image.

BACKGROUND ART

Recent years have seen higher resolution and more gray-levels in display devices, of which flat panel displays are representative, to allow images to be presented to a user with higher picture quality and a greater sense of realism. In addition, the video signals supplied to display devices have become digitized, typically with data being allotted at six bits per pixel to eight bits per pixel for each of the R (red), G (green), and B (blue) color components.

When the number of bits of the video signal and the number of bits that can be displayed on the display device are the same, the input signal is basically used as is to display on the display device. However, the number of bits of the video signal received as input frequently differs from the number of bits that can be displayed on the display device. When the number of bits of the video signal is greater than the number of bits that can be displayed on the display device, the number of bits of the video signal are reduced by using, for example, a method in which the lower-order bits are discarded, a dither method, or an FRC (Frame Rate Control) method.

On the other hand, when the number of bits of the video signal is less than the number of bits that can be displayed on the display device, the number of bits of the video signal is increased by adding lower-order bits (a gray-level extension process). This gray-level extension process is also used when data processing of a video signal according to characteristics of a display device is executed in the display device itself. The gray-level extension process is also executed to increase the arithmetic precision even when the number of bits of the video signal is the same as the number of bits that can be displayed on the display device. In this case, the above-described dither method or FRC is used to convert the video signal to the number of bits that can be displayed on the display device after the gray-level extension process has been executed.

The gray-level extension process has also been used for purposes other than converting the number of bits of the above-described digital signal or raising arithmetic accuracy. For example, when the number of bits of the digital signal is low, false contour (although gray-level should change smoothly within a plane, the portion of gray-level change is not perceived to change smoothly and a contour is discernible) become visible in regions in which gray-level changes smoothly such as in gradation. Gray-level extension processing is also used as a technique for preventing such false contours.

Generally, the gray-level extension process can be divided between two types: (1) a process for implementing the same process on all video signals; and (2) a process for extracting the video signal of a specific images and implementing processing only for necessary pixels.

As a method of performing the same processing on all video signals, a method can first be considered in which dither noise or random noise is added. Although this method can suppress false contours to a degree, it entails the problem of a noticeable added noise component.

In a second method, the values of higher-order bits are added as lower-order bits. For example, to convert a six-bit input signal "101101" to eight bits, the values of the highest two bits are added to the two lower-order bits to convert to "10110110."

As a third method, "0" or "1" is simply added to the lower-order bits.

The second and third methods are simple, but because the gray-level differences at points of gray-level change are not reduced, these methods cannot suppress false contours.

In contrast, as a method for (2) extracting video signals of specific images and performing processing only for necessary pixels, Japanese Patent Laid-Open No. S63-15576 (hereinbelow referred to as Patent Document 1) discloses a method of implementing a low-pass filter (LPF) process on false-contour regions. In this technique of the related art, regions in which false contours occur due to the implementation of gamma correction of a digital image signal (image processing) are adaptively determined in order to suppress the generated false contours, and in these regions, the integral value (the same meaning as the LPF process) of the video signals of neighboring pixels is supplied as output. This LPF process reduces the gray-level differences generated by false contours. However, in this method, when the spacing of generation of false contours (i.e., the spacing of contour lines) is greater than the filter size (the integral range of neighboring pixels), differences can be discerned in regions of gradation between sites at which the filter process is carried out and other sites in which the filter process is not carried out despite the suppression of false contours, and as a result, the method does not realize a marked improvement in image quality.

In response, a method is disclosed in Japanese Patent Laid-Open No. H04-165874 (hereinbelow referred to as Patent Document 2) as a second method in which, when regions in which change in gray-level is smooth (gradation region) are determined for the purpose of suppressing false contours that have been generated by the implementation of gamma correction (image processing), the gray-level values of pixels between contour lines of false contours in these regions are found by linear interpolation of the gray-level values of pixels on contour lines. This method enables uniform gray-level changes in gradation regions and the problems of the first method therefore do not arise.

As can be understood from the foregoing explanation, as the method of a gray-level extension process, a method in which specific information of pixels is detected and linear interpolation then carried out in accordance with the results of detection is preferable from the standpoint of suppressing false contours. Methods that use this linear interpolation are also disclosed in, for example, Japanese Patent Laid-Open No. 2003-304400 (hereinbelow referred to as Patent Document 3), Japanese Patent Laid-Open No. 2003-333348 (hereinbelow referred to as Patent Document 4), and Japanese Patent Laid-Open No. 2004-54210 (hereinbelow referred to as Patent Document 5).

In Patent Documents 3-5, the linear interpolation method is the same as in Patent Document 1 and Patent Document 2, but in contrast to Patent Document 1 and Patent Document 2, the bit depth of the digital image signal is shallow, and as a result, gray-level extension processing is carried out to solve the problem of false contour generation or to elicit the maximum gray-level performance of the display device.

The image processor disclosed in Patent Document 3 is of a configuration that includes a false contour detection unit and a pixel value converter.

This false contour detection unit takes as the detection conditions of a false contour a case in which the luminance level increases by "1" after the same luminance level has continued in the horizontal direction for two or more pixels (condition 1) and a case in which the same luminance level has continued two or more pixels in the horizontal direction after the luminance level has dropped by "1". The false contours that have been detected are then subjected to linear interpolation in the pixel value converter.

The color-signal extending apparatus disclosed in Patent Document 4 is of a configuration that includes a data distribution detection section and a data depth extending section. The data distribution detection section extracts (detects) regions in which color changes smoothly from the distribution state of gray-level data. More specifically, the data distribution detection section detects regions in which, in a pixel group K in which the same gray-level continues, the number of pixels is at least a minimum threshold value P and no greater than a maximum threshold value Q, and moreover, in which the gray-level difference with pixels of adjacent pixel groups is no greater than a determination threshold value S. The data distribution detection section then carries out the linear interpolation for regions of smooth change and determines the gray-level values that are added to these regions. The data depth extending section generates extended image data in which the data depth of the color signal is extended while adding the gray-level values to the extended portion.

The image processor disclosed in Patent Document 5 is of a configuration that includes a detecting means and a signal expanding means. The detecting means determines whether false contours exist by determining whether the difference between the first position in which the same pixel data continues and the first position at which the next pixel data continues is equal to the width over which the same pixel data continues, and further, by determining whether the gray-level value of a region in which the same pixel data continues is one greater or one smaller than the gray-level value of the next region in which the pixel data continues. Gray-level expansion is next carried out smoothly and linearly (by implementing linear interpolation) in the signal expanding means such that an image is obtained that continues smoothly in a region in which a false contour occurs.

However, in the inventions disclosed in the above-described Patent Documents 3-5, the process of detecting false contours is carried out only for a particular direction (for example, the horizontal direction) on the image plane, but false contours must be detected for two directions to obtain an adequate effect by means of the gray-level extension process. The problem therefore arises that a frame memory becomes necessary for holding the pixel data of a one-screen portion, thereby entailing higher costs. In addition, although a method can be considered for using a line memory that costs less than a frame memory, the use of a line memory allows detection of false contours in only one direction (for example, the horizontal direction) as in the inventions disclosed in Patent Documents 3-5 described hereinabove. In other words, the gray-level extension process is carried out for each line of an image.

As described hereinabove, carrying out the process of detecting false contours for each of two directions in an image processor of the related art necessitates the use of a frame memory and therefore raises the problem of increased costs. On the other hand, the use of a line memory to limit increase in costs means that the process of detecting false contours and the process of extending gray-levels are carried out for each line of an image, whereby the correlation between each line of an image is not considered. The problems therefore arise that linear noise of images becomes visible and a desirable gray-level extension process cannot be executed.

SUMMARY

It is therefore an object of the present invention to provide an image processor, a display device, an image processing method, and a program that enable the implementation of a more suitable gray-level extension process while reducing costs.

In the invention for achieving the above-described object, linear interpolation application regions, which are regions in which gray-level changes are to be smoothed for each line of the image signal, are detected by successively scanning pixel lines of an image signal that is supplied as input, and a gray-level extension process is then carried out upon the linear interpolation application regions that have been detected. In addition, the regions in which the gray-level extension process is carried out are subjected to a process for limiting gray-level changes to within prescribed values for a second direction that differs from the direction in which the detection process of linear interpolation application regions was carried out.

This limitation of gray-level changes to within prescribed values for the second direction for linear interpolation application regions enables the suppression of the occurrence of false contours that result from carrying out the gray-level extension process for only one direction. As a result, an appropriate gray-level extension can be carried out even when using a line memory.

Accordingly, the occurrence of false contours can be suppressed at low cost and images can be reproduced with excellent picture quality.

EXEMPLARY EMBODIMENT

Before a description of the present invention, the principles of the present invention will first be explained.
(Principles of the Present Invention)

In the gray-level extension process of the related art, the method for detecting regions in which false contours occur or regions in which a gray-level extension process should be carried out by linear interpolation to smooth gray-level changes (hereinbelow referred to as linear interpolation application regions) uses as the detection conditions: that regions in which pixels of the same gray-level value continue are adjacent, and moreover, that the difference in gray-level values between these regions be within a fixed range.

This method carries out detection of linear interpolation application regions using only the gray-level values of one particular direction, for example, the horizontal direction of the image (hereinbelow referred to as a unidirectional detection process) and accordingly does not consider at all the correlation with gray-level values of adjacent pixels in a perpendicular direction in the image plane, for example, the vertical direction. As a result, to carry out a more suitable gray-level extension process, detection of linear interpolation application regions must be carried out using bidirectional gray-level values (hereinbelow referred to as the bidirectional detection process). As a result, a frame memory is required, and application to an apparatus for which low cost is desired becomes problematic.

Figure 1:
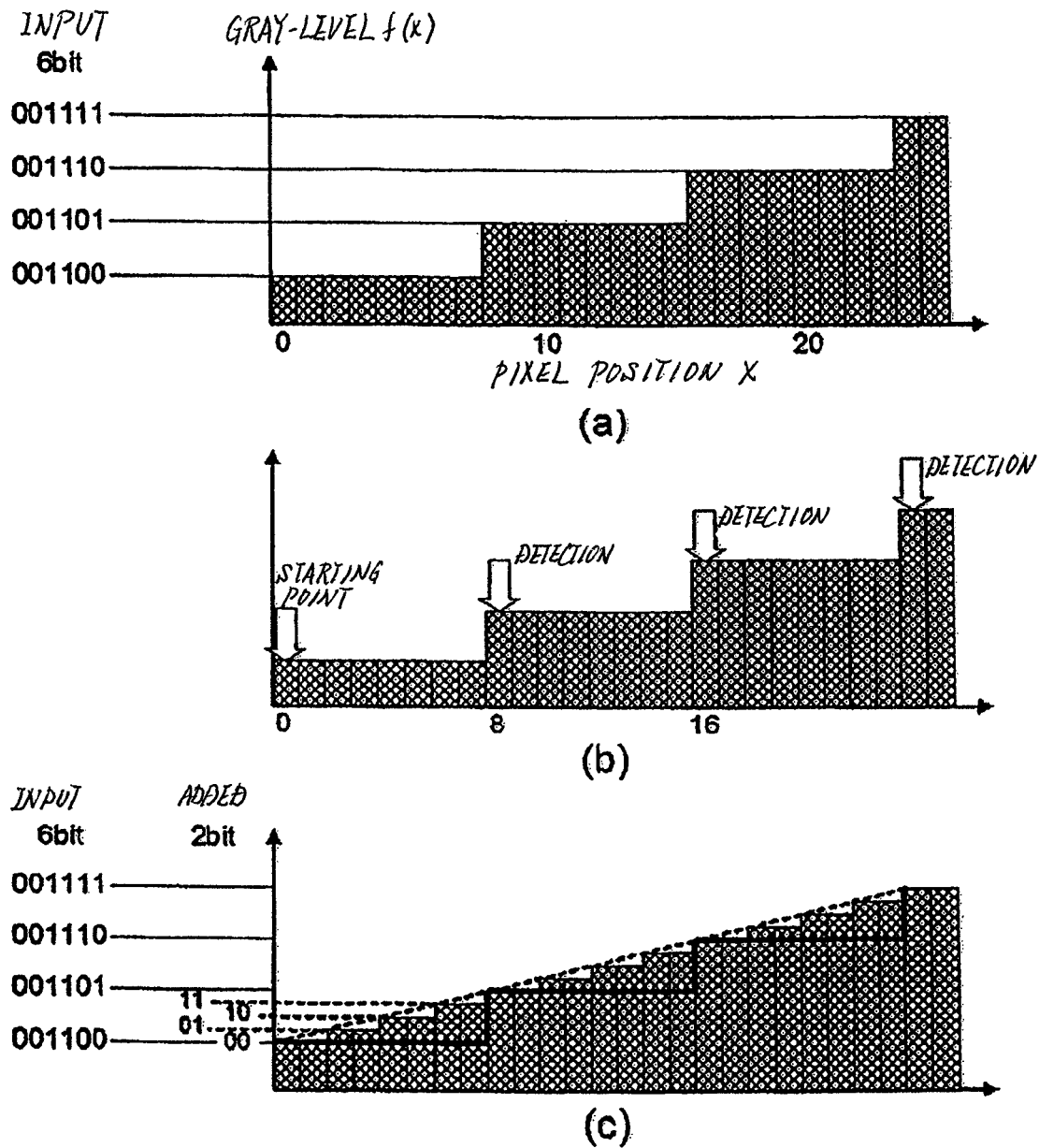
FIG. 1 is a schematic view showing an example of the detection process and linear interpolation process in the gray-level extension process.
Figure 2:
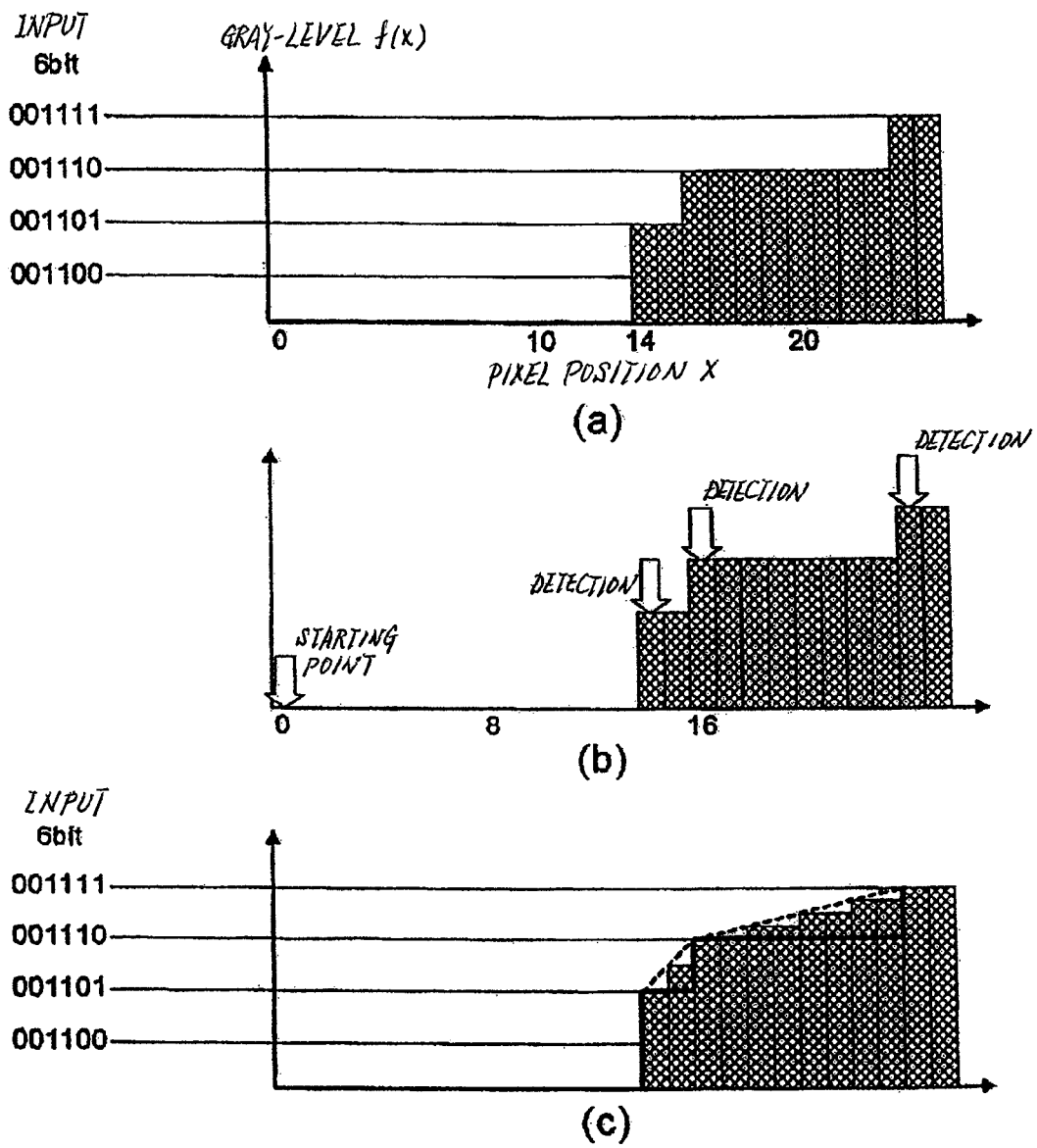
FIG. 2 is a schematic view showing another example of the detection process and linear interpolation process in the gray-level extension process.
Figure 3:
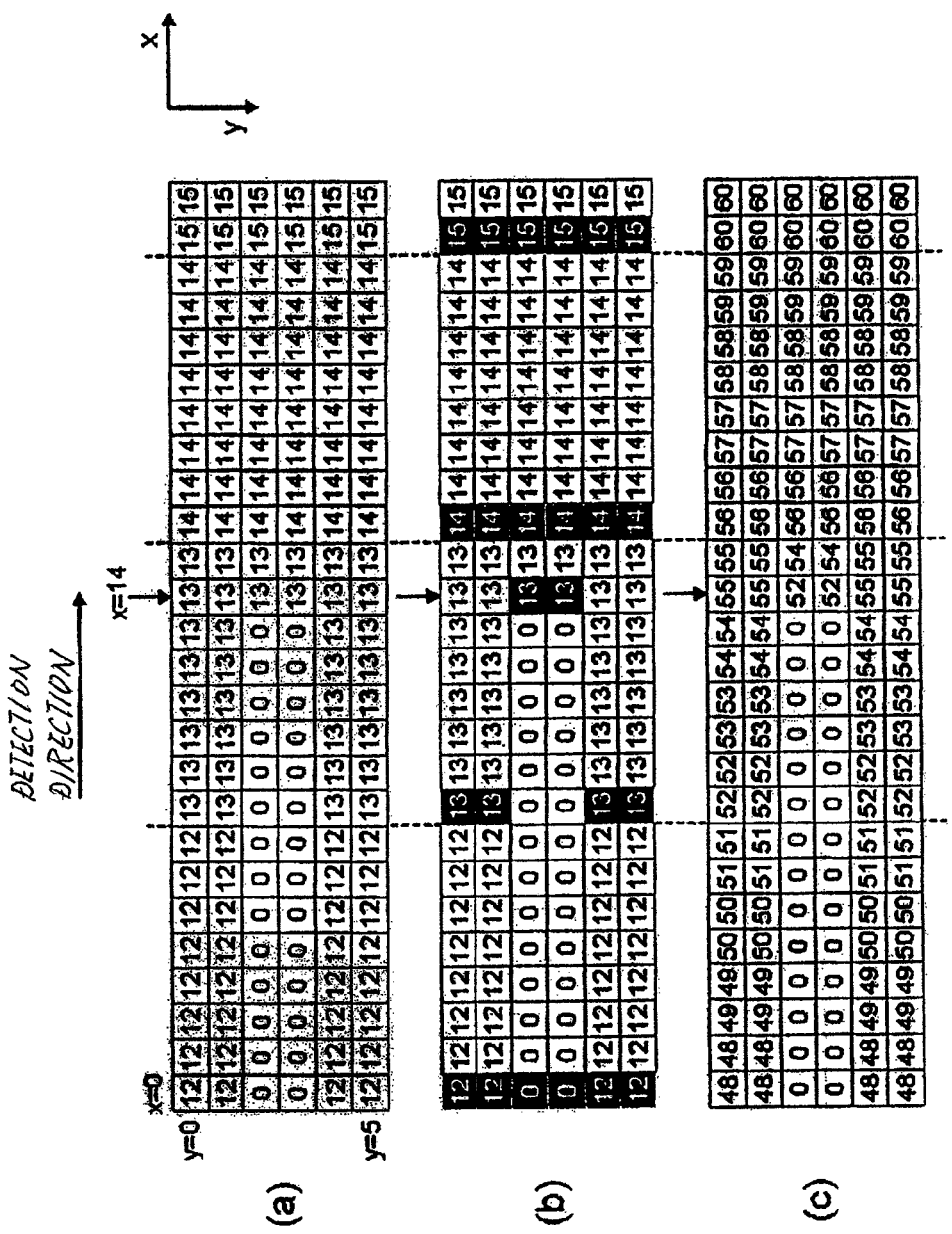
FIG. 3 is a schematic view showing an example of the detection process and linear interpolation process in the gray-level extension process that is executed upon a two-dimensional image.

In contrast, a frame memory is not required when linear interpolation application regions are detected using only unidirectional gray-level values. However, depending on the image, this approach can lead to undesirable gray-level extension process results. This drawback of the related art is explained using the specific example shown in FIGS. 1 to 3. FIGS. 1 and 2 show the procedures of two different methods for a unidirectional detection process and a gray-level extension correction process. In addition, FIG. 3 shows the processing results when the processes shown in FIGS. 1 and 2 have been executed for a plurality of lines.

FIG. 1(a) shows an example of a six-bit image signal that is the object of processing, FIG. 1(b) shows the detection results of linear interpolation application regions realized by a gray-level extension process of the related art, and FIG. 1(c) shows the results of implementing the gray-level extension process to eight bits (i.e., the generation of two bits that are added). In addition, the horizontal axis of FIGS. 1(a)-(c) shows the position x of a pixel, the vertical axis of FIG. 1 shows the gray-level value f(x), and the gray-level value of each pixel is shown by rectangles.

Regarding the six-bit image signals that are the objects of processing in FIG. 1(a), from f(0) to f(7) is (001100)bin (where (XXXXXX)bin indicates a binary number), f(8) to f(15) is (001101)bin, f(16) to f(23) is (001110)bin, and f(24) to f(25) is (001111)bin.

Because the gray-level value f(x) changes smoothly in this way according to change in position x of pixels, this pixel row is considered to represent gradation. In this type of gradation image, the gray-level preferably changes smoothly.

When the six-bit image signals shown in FIG. 1(a) are converted to an eight-bit image signals, contours and linear interpolation application regions are first detected.

In the contour detection process and linear interpolation application region detection process, x=0 is first held as the value of starting point Xs and the starting-point gray-level value f(0)=(00100)bin is held as the starting-point gray-level value Ts. The minimum position x that is greater than Xs and for which f(x)≠Ts is next detected. In this example, f(8)=(001101)bin≠Ts, and because Xs<8, x=8 is the detected point. In addition, the gray-level difference of f(8) and f(0) is 1 (minimum gray-level difference), and is considered to be a linear interpolation application region. The same process as described above is next successively executed with the detected point taken as the starting point and the gray-level value of the detected point as the starting-point gray-level value. The result is shown in FIG. 1(b), and in this example, x=8, 16, 24 are obtained as the detected points in addition to x=0. In this case, the gray-level differences are "1" and the same gray-level value continues from detected point to detected point at all of the detected points, and the pixel row is therefore considered to be a linear interpolation application region at least from x=0 to x=24.

A two-bit gray-level extension process is next carried out for the image signal based on the above-described detection results.

In the gray-level extension process, an interpolation process is carried out upon the region (the pixel row from x=0 to 24) that was considered to be linear interpolation application region shown in FIG. 1(b).

In the interpolation process, the gray-level values between each of the detected points are first connected by a straight line (the inclined dotted line in FIG. 1(c)). The values of the two bits that are added to the gray-level value and that are values closest to this straight line are next determined. For example, if the starting-point of the line is starting-point position Xs and the end point of the line is end-point position Xe in the region from x=0 to 8, the values of the two bits to be added can be found by the equation: (added values)=(x−Xs)/(Xe−Xs)·4=(x−0)/(8−0)·4 (values less than the decimal point being discarded). The sign "·" in the equation above indicates "x," which indicates multiplication.

Here, "4" is found by the square of 2 (added bit numbers). From the equation above, the values that are added are (00)bin for x=0, 1; (01)bin for x=2, 3; (10) for x=4, 5; and (11)bin for x=6, 7. By adding these values as lower-order bits to the six-bit pixel data (gray-level value), eight-bit extended corrected data can be obtained. In addition, (00)bin is added to pixel data of x=25 that are not contained in the linear interpolation application region.

Looking at the processing results of FIG. 1(c), it can be seen that extending the pixel data to eight bits changes the gray-level difference between a detected point and a detected point to four steps and makes the gray-level change smoothly.

On the other hand, FIG. 2 shows the results of carrying out the same process upon an image having different gray-level values.

FIG. 2(a) shows a case that differs from the image signal shown in FIG. 1(a) in that, of the image signals that are the objects of processing, the gray-level values from x=0 to x=13 are all (000000)bin.

FIG. 2(b) shows the contour detection results and the detection results of linear interpolation application regions. As in FIG. 1(b), starting-point position Xs and starting-point gray-level value Ts are each held. The first detected point for which f(x)≠Ts is x=14, and the same detection process is subsequently carried out. Here, gray-level changes are detected at x=16, 24 (thus becoming detected points).

A linear interpolation application region is next determined based on these detection results. In this case, a case is explained that uses the following three conditions as the conditions of a linear interpolation application region: (1) a plurality of pixels continue in which the gray-level value is the same as the starting-point position, and moreover, a plurality of pixels continue in which the gray-level value is the same as the end-point position; (2) the gray-level change of the starting-point position is a decrease, and moreover, is a gray-level change that should be smoothed; or the gray-level change of the end-point position is an increase, and moreover, is a gray-level change that should be smoothed; and more specifically, the difference between the gray-level value of the starting-point position and the gray-level value of the end-point position is a minimum gray-level difference (for example, the gray-level difference is "1"); (3) when the starting-point position is other than x=0, the gray-level change at the starting-point position and the gray-level change at the end-point position are both increases or both decreases. Although several variations can be considered regarding the detection conditions, all have the same object of determining regions in which linear interpolation is to be carried out to cause the gray level to change smoothly.

The above-described (1) is a condition that gray-level change need not be smoothed in a region in which gray-level changes with each pixel; the above-described (2) is a condition for distinguishing between a normal contour and a false contour for which gray-level change should be smoothed; and the above-described (3) is a condition for determining regions in which an interpolation process is executed to simply increase or decrease gray-level in the region. The gray-level data shown in FIG. 1 satisfy the above-described conditions (1) to (3) from pixel position x=0 to 24.

As shown in FIG. 2(b), determinations are carried out by means of the above-described conditions in order from x=0 for each pixel data.

If Xs=0 and Xe=14, condition (2) is not satisfied at these positions (gray-level change need not be smoothed at either the starting-point position or the end-point position), and this region is therefore not determined to be a linear interpolation application region.

Next, taking Xs=14 and Xe=16, all conditions are satisfied at these positions and this region is therefore a linear interpolation application region. It can also be seen that a linear interpolation application region is also determined for Xs=16 and Xe=24.

FIG. 2(c) shows the results of implementing the linear interpolation process on pixel position x=14 to 16 and x=16 to 24. The processing method is the same as the method described using the above-described FIG. 1.

As shown in FIG. 2(c), the linear interpolation process results in the region from pixel position x=16 to 24 is the same as FIG. 1(c). However, interpolation process results having a steep inclination are obtained for the region from pixel position x=14 to 16, in contrast with FIG. 1(c).

The processing steps when the two-dimensional image shown in FIG. 3(a) is received as input are next shown based on the process results shown in FIG. 1 and FIG. 2. FIG. 3(a) is an image of 26 horizontal pixels by six vertical pixels. In addition, the horizontal direction is x, the vertical direction is y, and the direction of the linear interpolation application region detection process and interpolation process is x.

Regarding the two-dimensional image that is the object of processing, the lines y=0, 1, 4, 5 are the same as in the image data shown in FIG. 1, and the lines y=2, 3 are the same as the input image data of FIG. 2. Since the object of processing is a two-dimensional image, the gray-level value of each pixel is shown on the vertical axis in FIGS. 1 and 2, but in FIG. 3(a), the six-bit gray-level values are shown by numbers that have been converted to decimal numbers. The gray-level values are shown by f(x, y).

FIG. 3(b) shows the detection results of linear interpolation application regions. FIG. 3(b) applies the detection process results shown in FIGS. 1(b) and 2(b) to each line, and the obtained detected points are shown in black.

FIG. 3(c) shows the result of the gray-level extension process. Because the gray-level values after processing are of eight bits, values obtained by converting the eight-bit gray-level values to decimal numbers are shown by numbers in FIG. 3(c).

Here, the undesirable results of the gray-level extension process in which linear noise is generated in the direction of detection in a unidirectional detection process are described taking as an example the line of x=14.

As shown in FIG. 3(a), the values of x=14 before the gray-level extension process are all "13," and it can be seen that this is a smooth gray-level change. On the other hand, as shown in FIG. 3(c), the values of x=14 after the gray-level extension process are 55, 55, 52, 52, 55, and 55. Thus, by carrying out a gray-level extension process in the x direction, the values of the row x=14, which was originally a smooth gray-level change, give rise to a three-tone gray-level change at y=1 and 2, y=3 and 4. This type of gray-level change occurs according to the differences of spacing of detected points between lines, and in the example shown in FIGS. 3(a)-(c), although a one-pixel gray-level change (x=14) is produced between an eight-pixel space (y=0, 1, 4, 5) and a two-pixel space (y=2, 3), an eight-pixel gray-level change will be produced between a 64-pixel space and a 16-pixel space. In this way, when a region in which gray-level changes continues over a long distance in the horizontal direction, this region is recognized as a contour and is perceived as linear noise in the horizontal direction.

This linear noise that is perceived occurs because the gray-level extension process is carried out in only one direction. Thus, in order to suppress this linear noise, a process is preferably carried out to suppress gray-level changes to within a prescribed value with a second direction that differs from the direction in which the above-described detection process was carried out.

More specifically, after the gray-level extension process, correction is carried out based on the gray-level values of neighboring y-direction pixels. Specifically, the gray-level value of each pixel is compared before the gray-level extension process and after the gray-level extension process, and when the gray-level change in the y-direction before the gray-level extension process is within fixed range (i.e., the change is smooth), and moreover, the gray-level change in the second direction after the gray-level extension process is greater than the gray-level change in the second direction before the gray-level extension process (in other words, the gray-level extension process causes the gray-level change in the y-direction to lose smoothness), a process is carried out to limit this gray-level change to within prescribed values.

Figure 4:
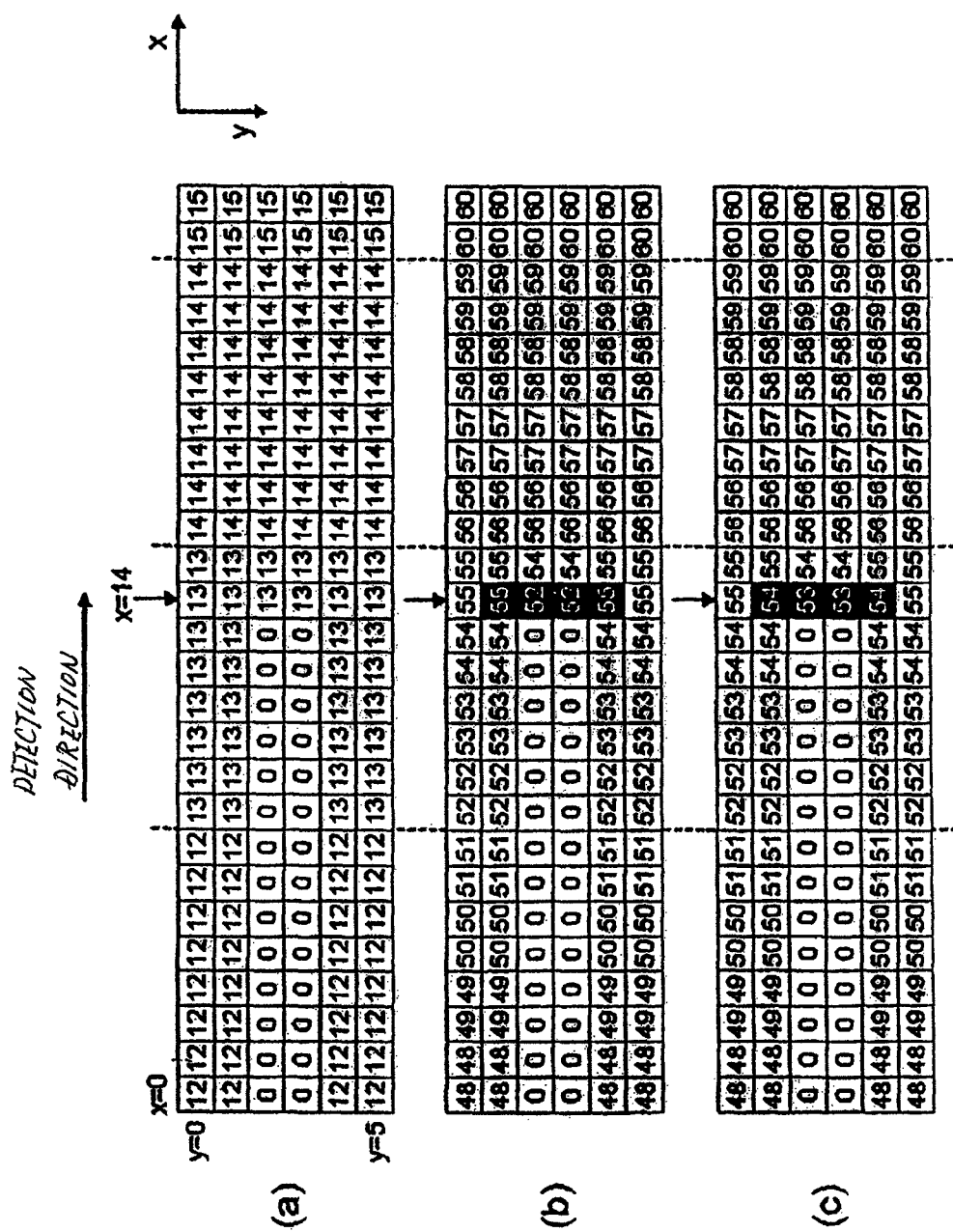
FIG. 4 is a schematic view showing an example in which the gray-level change limitation process of the present invention is carried out upon the image shown in FIG. 3.

FIG. 4 shows the processing results when the gray-level change is limited within prescribed values. FIG. 4(a) is the same image as FIG. 3(a), and the results of carrying out the gray-level extension process upon the input image in only one direction are FIG. 4(b) (the same image as FIG. 3(c)).

In FIG. 4(b), the gray-level change in the y-direction of the region of x=14 shown in black satisfies two of the above-described conditions (a gray-level change that was originally smooth has lost smoothness due to the gray-level extension process). In the region of x=15, the gray-level change is 1 and is thus determined to still be smooth.

FIG. 4(c) shows the results of using a 1×3 spatial-averaging filter as the process for limiting the gray-level change to within prescribed values. A 1×3 spatial-averaging filter is a process for making the average value of the gray-level value of a pixel of interest (the pixel that is the object of processing) and the gray-level values of adjacent pixels in a second direction (in this case, the pixels above and below the pixel of interest) the output gray-level value of the pixel of interest. For example, if the pixel of interest is f(14, 2), the gray-level value of f(14, 1) is 55, the gray-level value of f(14, 2) is 52, and the gray-level value of f(14, 3) is 52, and the value after the process of limiting the gray-level change is therefore f(14, 2)=(55+52+52)/3=53.

As shown in FIG. 4(c), the process of limiting the gray-level changes limits gray-level changes other than normal contour portion (a contour in which the gray-level change before the gray-level extension process is at least 2) to 1 or less, and linear noise is not perceived.

In the preceding explanation, a spatial smoothing filter was used as a process for limiting gray-level change to within prescribed values, but the present invention is not limited to this form if this limitation can be achieved by other methods. For example, it can be anticipated that the same effect will be achieved by clipping gray-level values such that the gray-level differences in the y-direction other than contour portions are within prescribed values (for example, no greater than 1).

Alternatively, as another method for suppressing linear noise, in a section following the gray-level extension process, the gray-level values of an image signal following the gray-level extension process may be compared with respect to a second direction that differs from the direction in which the detection process was carried out, and if the gray-level change is smaller than the gray-level difference obtained when the smallest gray-level difference before the gray-level extension process is converted to a value after the gray-level extension process, a process may be carried out for limiting this gray-level change to within prescribed values.

In this case, processing can be realized by using only the image signal following the gray-level extension process, whereby the line memory can be further decreased.

In the foregoing explanation, the second direction is assumed to be a y-direction perpendicular to the x-direction in which the gray-level extension process is carried out, but the second direction may be any direction that differs from the direction in which the gray-level extension process is carried out, and may be not only a direction perpendicular to the direction in which the gray-level extension process is carried out but also a direction oblique to the direction in which the gray-level extension process is carried out. In this case, the process for limiting gray-level change is a process for limiting gray-level changes with pixels that are adjacent in an oblique direction with respect to the direction in which the gray-level extension process is carried out to within prescribed values.

Based on the foregoing explanation, the present invention, as means for carrying out a gray-level extension of a digital image signal:

(1) includes a detection unit for detecting a linear interpolation application region and an extension-correction unit for carrying out gray-level extension based on the detection results; and (2) for the purpose of limiting false contours that originate from the gray-level extension process, provides a gray-level-change limitation unit for carrying out a process for limiting, to within prescribed values, the gray-level changes with respect to pixels in a second direction that differs from the direction in which the detection process was performed to realize an appropriate gray-level extension process while using a line memory.

According to the present invention, the application of an apparatus, method, or program shown below enables the execution of a gray-level extension process at low cost that can suppress the occurrence of false contours.

For example, in an image processor, by detecting linear interpolation application regions of image data by the above-described detection method, executing a gray-level extension process based on the detection results, and further, performing a gray-level change limitation process, the occurrence of false contours can be suppressed at low cost and images can be reproduced with excellent image quality.

The apparatus for executing the above-described detection process, gray-level extension process, and gray-level change limitation process may be made up from an LSI composed of logic circuits, or can be realized by an information processor such as a computer that executes processes in accordance with a program. In this case, a configuration may be adopted in which the detection process is carried out by an image detection device and the gray-level extension process and gray-level change limitation process are executed in accordance with a gray-level extension program and gray-level change limitation program, or a configuration may be adopted in which the detection process and gray-level extension process are executed in accordance with a detection program and gray-level extension program and the gray-level change limitation process is carried out by a gray-level change limitation device.

In addition, an image processing method, an image processing program, an image detection device that executes only a detection process, an image detection method, and an image detection program can be offered as derivative forms of the image processor of the present invention.

Figure 5:
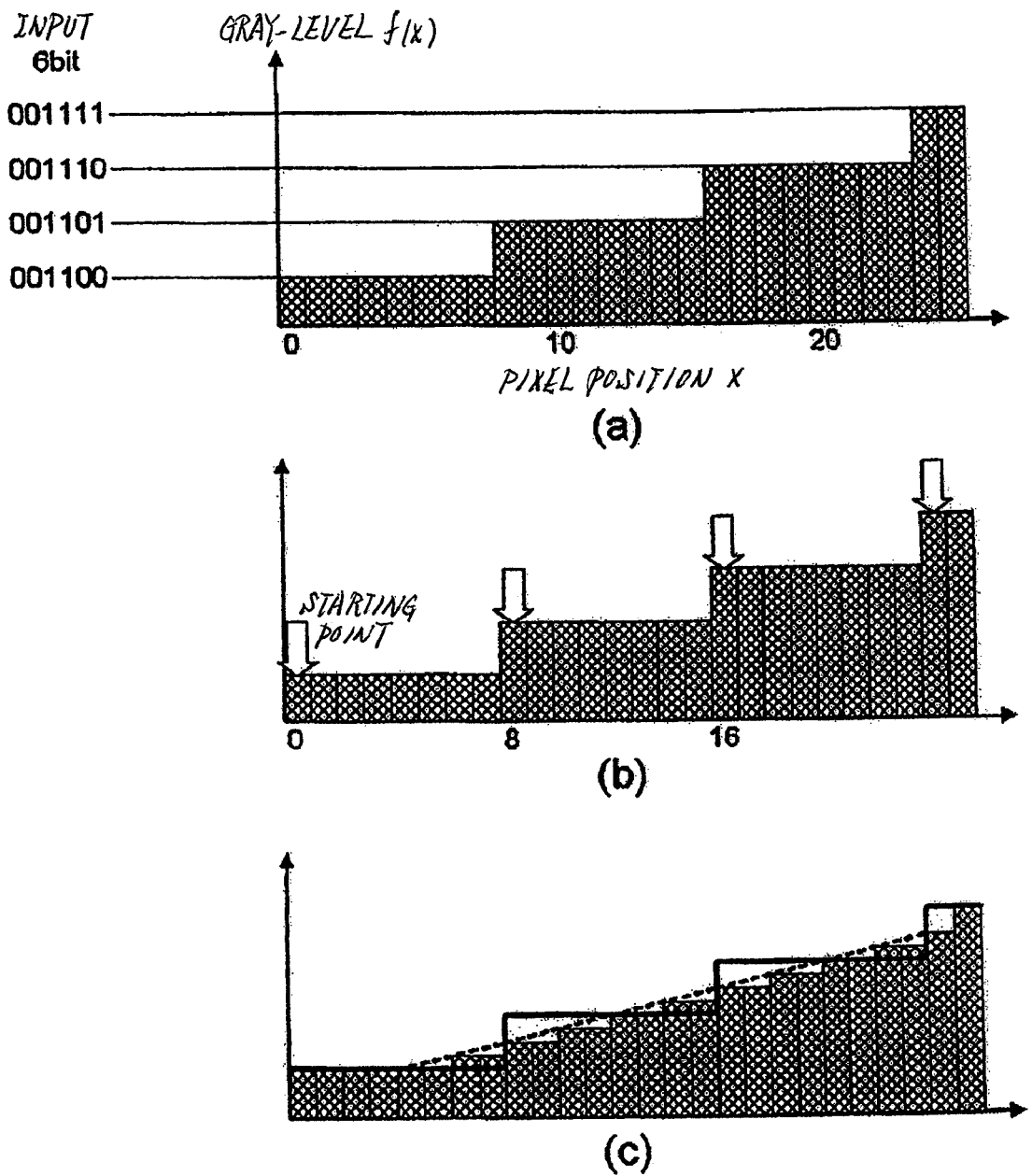
FIG. 5 is a schematic view showing another example of the linear interpolation process in the gray-level extension process.

The gray-level extension process is not limited to the method shown in FIGS. 1 to 4 and may employ other processes. For example, as shown in FIGS. 5(a)-(c), a method is also possible in which points for which the difference in gray-level value at a detected point is ½ may be joined together (the inclined dotted line in FIG. 5(c)) and bits to be added then determined to obtain values closest to this line. The six-bit image data that are the object of processing shown in FIG. 5(a) are similar to FIG. 1(a), and the detection results of linear interpolation application regions shown in FIG. 5(b) are similar to FIG. 1(b).

Further, instead of the linear interpolation process, any other interpolation function can be used. In the present invention, executing a gray-level change limitation process enables the implementation of a gray-level extension process that can suppress the occurrence of false contours at low cost regardless of the type of interpolation process.

Explanation next regards exemplary embodiments of the present invention based on the principles described hereinabove.

First Exemplary Embodiment

Figure 6:
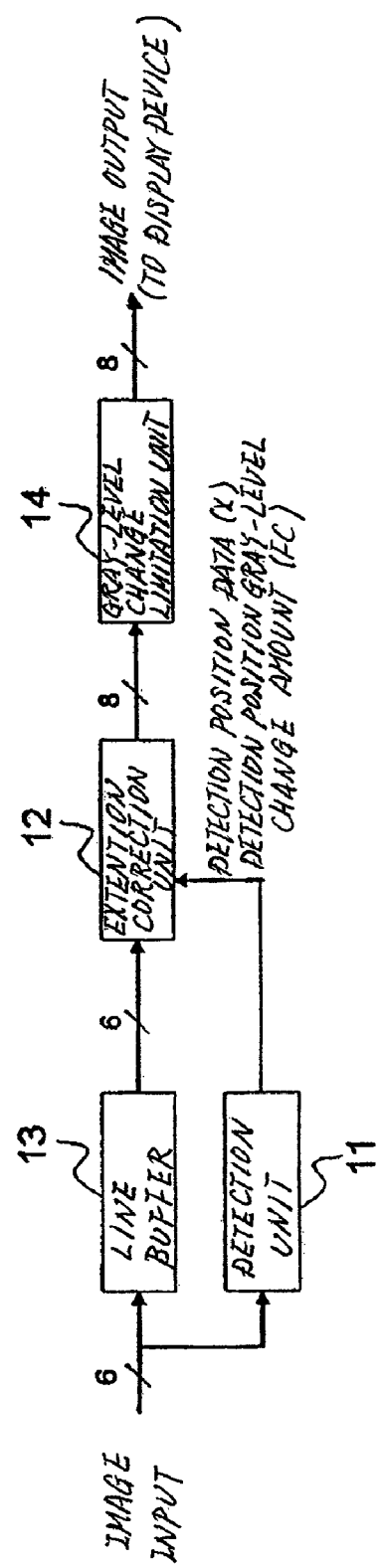
FIG. 6 is a block diagram showing the configuration of the image processor that is the first exemplary embodiment of the present invention.

FIG. 6 is a block diagram showing the configuration of an image processor that represents the first exemplary embodiment of the present invention. The image processor shown in FIG. 6 is an actual apparatus for executing the processes of the present invention described hereinabove.

As shown in FIG. 6, the image processor of the first exemplary embodiment is of a configuration that includes detection unit 11, line buffer 13, extension-correction unit 12, and gray-level-change limitation unit 14. The image processor of the first exemplary embodiment sequentially receives six-bit image data as input and converts this six-bit image data to eight-bit image data to supply to, for example, a display device.

Detection unit 11 sequentially scans each row of the six-bit image data that are received as input, and detects linear interpolation application regions in which the gray-level is to be made smooth by applying a gray-level extension process which uses linear interpolation for each row.

In addition, detection unit 11 may execute a process whereby, upon detecting a gray-level change within a particular fixed range (for example, a minimum gray-level difference) while sequentially scanning each row of image data that have been received as input, detection unit 11 determines this gray-level change to be noise if the gray-level value of the next position after the position in which this gray-level change was detected is the same as the gray-level value of the preceding position, and considers the gray-level value of the pixel in which the gray-level change was detected to be the gray-level value of the pixels at positions that precede and succeed that pixel. This process is not an essential feature of the present invention, but the implementation of such a process can prevent the detection of noise or error components as false contours and can realize a detection process that is resistant to noise and errors.

Line buffer 13 stores six-bit image data that are received as input while the detection process is being executed in detection unit 11.

Extension-correction unit 12 uses position data X of detected points obtained in detection unit 11 and gray-level change amount FC of the detected points to perform gray-level extension process upon image data supplied from line buffer 13. By the provision of line buffer 13 in the image processor of the present exemplary embodiment, extension correction is carried out at the appropriate position of an image based on the detection results.

Gray-level-change limitation unit 14 compares a plurality of items of adjacent image data for each row and carries out a process for limiting the gray-level change between adjacent pixels to within prescribed values.

FIG. 6 shows a construction corresponding to one color of each of the color components of RGB, but the image processor of the present exemplary embodiment includes the same constructions in parallel for the other two colors. The other exemplary embodiments are the same regarding this point.

Explanation regarding the image processor of the present exemplary embodiment is divided among detection unit 11, extension-correction unit 12, and gray-level-change limitation unit 14.

Figure 7:
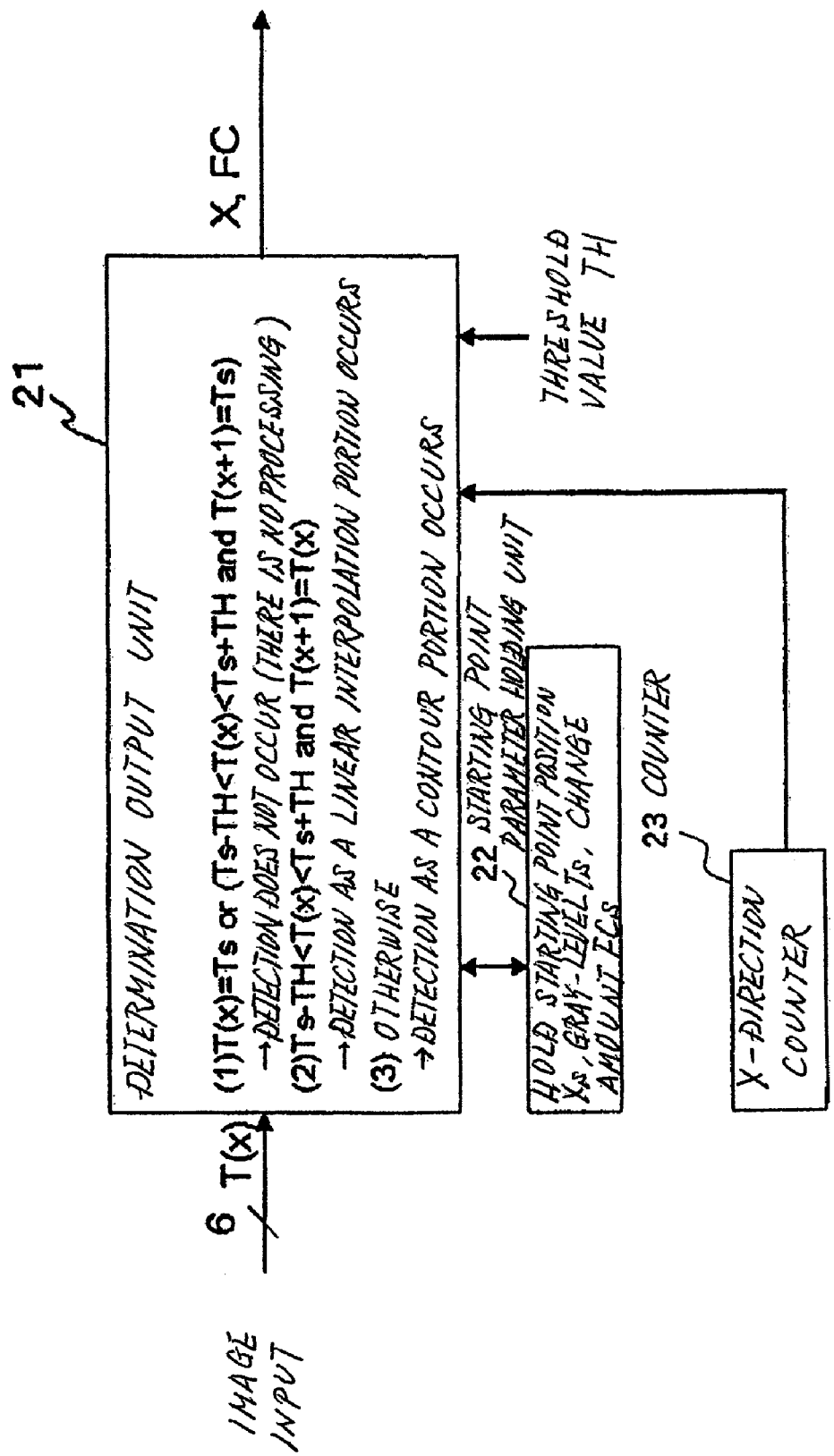
FIG. 7 is a block diagram showing an example of the configuration of the detection unit provided in the image processor shown in FIG. 6.
Figure 8:
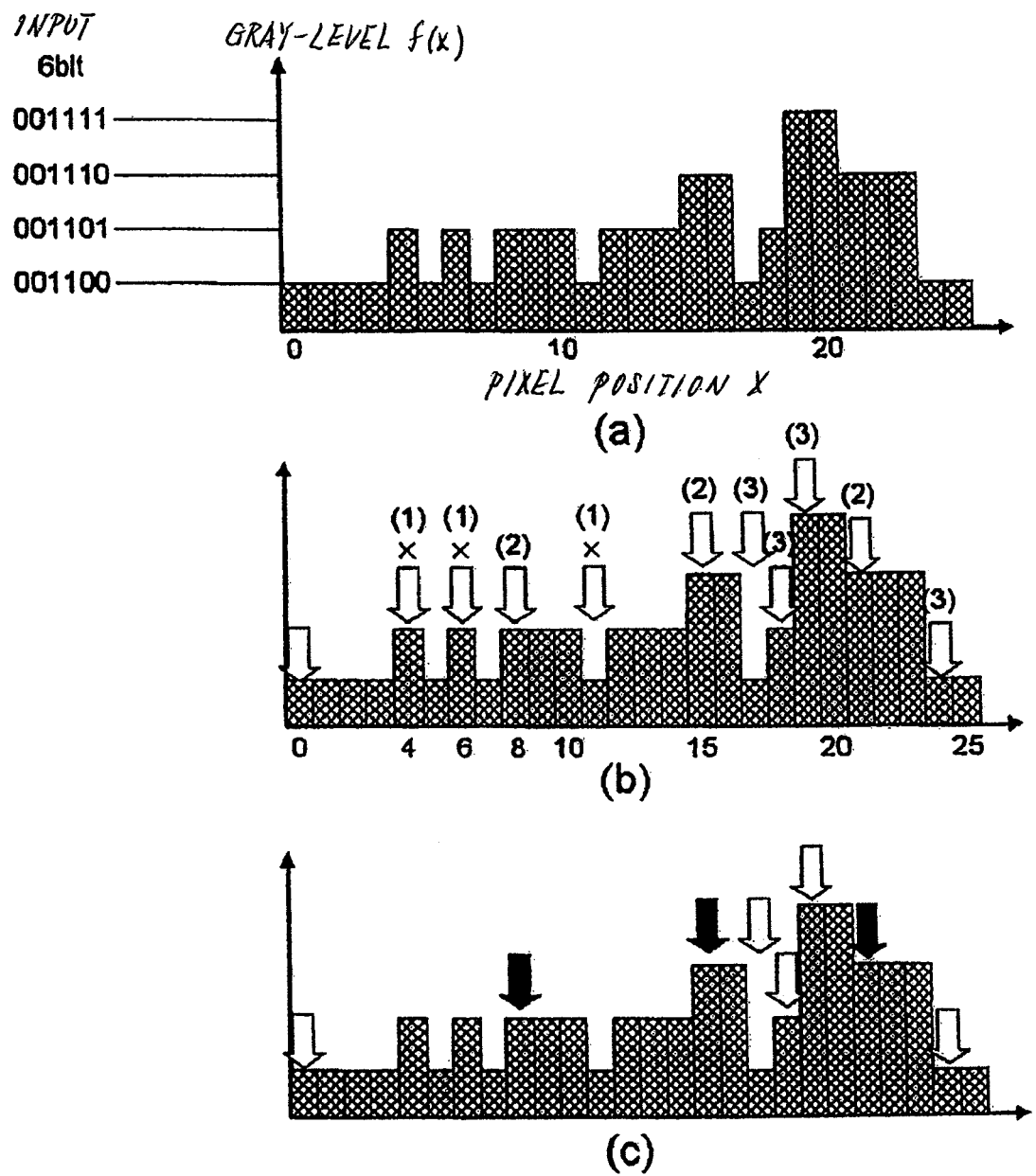
FIG. 8 is a schematic view showing the process of the detection unit provided in the image processor shown in FIG. 6.

Explanation first regards the specific configuration and operation of detection unit 11 using FIGS. 7 and 8.

FIG. 7 is a block diagram showing an example of the configuration of the detection unit shown in FIG. 6, and FIG. 8 is a chart showing the form of processing when any pixel row is applied as input to the detection unit shown in FIG. 7.

As shown in FIG. 7, detection unit 11 is of a configuration that includes determination output unit 21, starting-point parameter holding unit 22, and counter 23. Counter 23 is used for achieving a relative comprehension of the order of positions of image data that are sequentially received as input. Counter 23 need not be provided if the position of image data that have been received as input is known. Starting-point parameter holding unit 22 holds starting-point position Xs, starting-point gray-level Ts, and starting-point gray-level change amount FCs, these being parameters necessary for the determination process of determination output unit 21. When a new detected point is obtained in determination output unit 21, the above-described parameters are updated.

Gray-level change amount FC is information that both indicates whether detected gray-level change is a gray-level change in the direction of increase or a gray-level change in the direction of decrease and whether this gray-level change is a gray-level change for which the linear interpolation process should be implemented or a contour region for which the linear interpolation process need not be implemented.

More specifically, the gray-level change amount FC is a value as shown below:

FC=00 . . . indicates gray-level change for which the linear interpolation process should be carried out, the gray-level change being in the direction of increase.

FC=01 . . . indicates gray-level change for which the linear interpolation process should be carried out, the gray-level change being in the direction of decrease.

FC=10 . . . indicates a contour region for which the linear interpolation process should not be carried out.

Determination output unit 21 carries out the following determination based on image data T(x) that have been received as input (here, x indicates the position of images that are received sequentially, and T(x) indicates the gray-level value of position x) and the parameters and preset threshold value TH that are being held in starting-point parameter holding unit 22.

(1) When T(x)=Ts (when the starting-point gray-level and the gray-level of the input image are the same) or (Ts−TH<T(x)<Ts+TH and T(x+1)=Ts) (when the gray-level change of the input image is within the range of the starting-point gray-level±threshold value; and moreover, the gray-level at position x+1 is the same as the starting-point gray-level: this corresponds to the elimination of noise/error component, which is the above-described added process), the detected gray-level change is not taken as a detected point (no processing is carried out, and the output is not altered).

(2) When Ts−TH<T(x)<Ts+TH and T(x+1)=T(x) without satisfying the condition of (1) (when the gray-level change of the input image is within the range of the starting-point gray-level±threshold value, and moreover, the gray-level at position x+1 and position x are the same), this gray-level change is taken as a linear interpolation application region for which the linear interpolation process is to be carried out. It is assumed at this time that output position X=x, output gray-level change amount FC is FC=00 when Ts<T(x) and FC=01 when Ts>T(x). In addition, the parameters held in starting-point parameter holding unit 22 are each altered such that Xs is x, Ts is T(x), and FCs is FC and used in the next and following processes.

(3) When the conditions of (2) are not satisfied, this gray-level change is taken as a contour region. It is assumed that at this time, output position X=x and output gray-level change amount FC=10. In addition, as in (2), the parameters being held in starting-point parameter holding unit 22 are each altered such that Xs is x, Ts is T(x), and FCs is FC and used in the next and following processes.

In addition, when a process for preventing detection of a noise/error component as a contour is not applied in (1), a point should not be determined as a detected point only when T(x)=Ts (when the starting-point gray-level and the gray-level of the input image are the same). In this configuration as well, the effect of the present invention is unchanged.

In this way, in detection unit 11, a pixel row of an image signal is sequentially scanned and detection proceeds dividing between detected points that are to be the objects of the linear interpolation process and detected point that are not to be objects.

Threshold value TH is a reference value for determining whether the gray-level change at a detected point is to be smoothed by correction or is to be held without change. Threshold value TH may be set to an appropriate value based on the content of the processing or the characteristics of the input images. The simplest value is TH=2 for smoothing gray-level change of the minimum gray-level difference. If the minimum gray-level difference of the input image (for example, one screen portion) is "2," regions having this minimum gray-level difference are determined to be regions in which gray-level change is to be smoothed. The threshold value TH can also be set to TH=3.

The above-described process is checked taking as an example a case in which a pixel row such as shown in FIG. 8(a) is received as input (determination (1) uses an additional conferring process). In this case, threshold value TH=2, and the image signal is assumed to be received sequentially from x=0.

An initial condition is set that indicates that no parameters are being held in starting-point parameter holding unit 22. For example, when gray-level value T(0)=(001100)bin is applied as input at x=0, Xs=0, Ts=T(0), and FCs=10 are held. FCs=10 is set because the presence of gray-level change cannot be determined at x=0 (because the data x=−1 does not exist).

When the starting-point parameters are set, the detection process of detected points proceeds from x=1 in determination output unit 21. Because T(1)=Ts, processing moves to the next pixel value T(2) without executing the detection process.

Upon reaching x=4, T(4)≠Ts, and T−TH<T(4)<Ts+TH, and moreover, T(5)=Ts, whereby condition (1) is satisfied and detection is not carried out.

Upon reaching x=8, first Ts−TH<T(8)<Ts+TH, and moreover, T(9)=T(8), whereby condition (2) is satisfied. Accordingly, the output X=8 and FC=00 is supplied, and the starting-point parameters are updated to Xs=8, Ts=(001101)bin, and FCs=00. Then, using these updated parameters, the detection process is carried out from x=9.

The above-described processing is repeatedly executed (FIG. 8(b)), and the results of carrying out the detection process to the end are shown in FIG. 8(c). In FIG. 8(c), arrows are affixed to detected points, the black arrows indicating detected points for which the linear interpolation process is to be implemented, and the white arrows indicating detected points for which the linear interpolation process is not to be carried out. Extension-correction unit 12 determines that a detected point is a detected point for which the linear interpolation process is to be implemented when the gray-level change amount FC is 00 or 01 and determines that a detected point is not a detected point for which the linear interpolation process is to be carried out when the gray-level change amount FC is 10. In the example shown in FIG. 8(c), it can be seen that the region from x=0 to 15 is an object of the linear interpolation process. In the related art, this region would be determined to be a region in which the linear interpolation process is not to be carried out due to one-pixel one-gray-level noise/error component.

Figure 9:
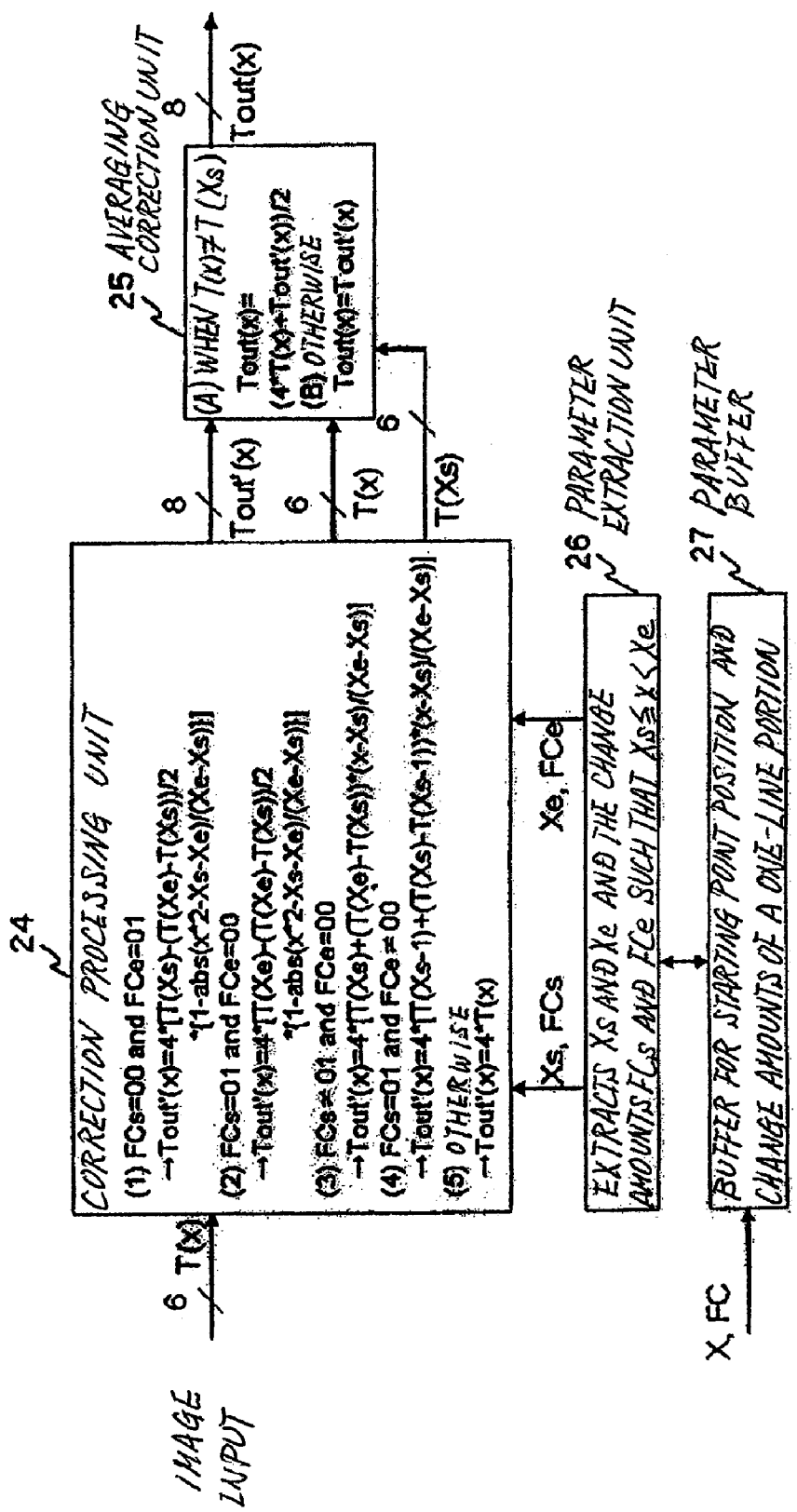
FIG. 9 is a block diagram showing an example of the configuration of the extension-correction unit provided in the image processor shown in FIG. 6.
Figure 10:
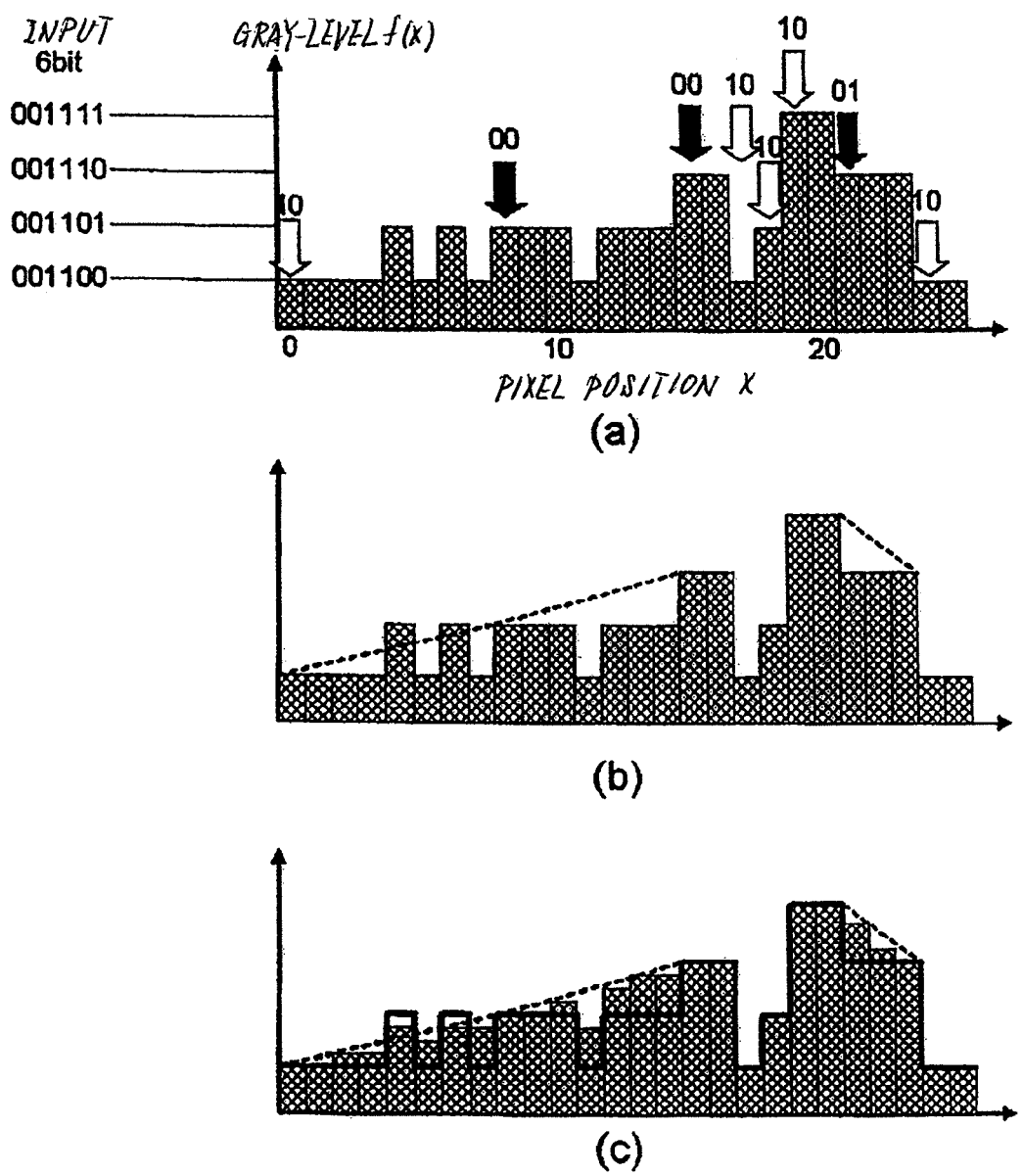
FIG. 10 is a schematic view showing the process of the extension-correction unit provided in the image processor shown in FIG. 6.

Explanation next regards the configuration and operation of extension-correction unit 12 using FIGS. 9 and 10.

FIG. 9 is a block diagram showing an example of the configuration of the extension-correction unit shown in FIG. 6, and FIG. 10 is a graph showing the results of the gray-level extension process when any pixel row is applied as input to the extension-correction unit.

As shown in FIG. 9, extension-correction unit 12 is of a configuration that includes correction processing unit 24, averaging-correction unit 25, parameter extraction unit 26, and parameter buffer 27. In addition, averaging-correction unit 25 is used when executing a process for preventing the detection of a noise or error component as a false contour in detection unit 11 and is unnecessary when such a process is not carried out. The effect of the present invention is unchanged even for a configuration that lacks averaging-correction unit 25.

As shown in FIG. 9, parameter buffer 27 stores detection position X and gray-level change amount FC that are obtained in detection unit 11 for each image line. Parameter extraction unit 26 acquires from parameter buffer 27 Xs and Xe such that Xs<x<Xe according to pixel position x of an image that has been received as input in correction processing unit 24 and the change amounts FCs and FCe.

Correction processing unit 24 receives as input image signal T(x) that has been subjected to pipeline delay by line buffer 13, carries out a gray-level extension process based on this input value and Xs, Xe, FCs, and FCe that are acquired from parameter extraction unit 26, and supplies the result of this processing Tout'(x) and input signal T(x). In the gray-level extension process, any one of the five methods of processing shown below is selected and executed according to the values of FCs and FCe:

(1) When FCs=00 and moreover, FCe=01

$$Tout'(x)=4\cdot[T(Xs)-(T(Xe)-T(Xs))/2\cdot\{1-abs(x\cdot 2-Xs-Xe)/(Xe-Xs)\}]$$

(2) When condition (1) is not satisfied, FCs=01, and moreover, FCe=00:

$$Tout'(x)=4\cdot[T(Xe)-(T(Xe)-T(Xs))/2\cdot\{1-abs(x\cdot 2-Xs-Xe)/(Xe-Xs)\}]$$

(3). When condition (2) is not satisfied, FCs≠01, and moreover, FCe=00:

$$Tout'(x)=4\cdot[T(Xs)+(T(Xe)-T(Xs))\cdot(x-Xs)/(Xe-Xs)]$$

(4) When condition (3) is not satisfied, FCs=01, and moreover, FCe≠00:

$$Tout'(x)=4\cdot[T(Xs-1)+(T(Xs)-T(Xs-1))\cdot(x-Xs)/(Xe-Xs)]$$

(5) When the above-described conditions (1) to (4) are not satisfied:

$$Tout'(x)=4\cdot T(x)$$

Values smaller than the decimal point are discarded. The above-described (1) to (4) are linear interpolation processes, (1) and (2) are convex and concave linear interpolation processes, and (3) and (4) are linear interpolation processes similar to an example of the related art. In addition, (5) is a process of adding a fixed gray-level value and is used for detected points for which the linear interpolation process is not implemented.

Although the above-described interpolation processes are used in the first exemplary embodiment, the present invention is not limited to this form, and the effect of the present invention can be obtained even when, for example, only (3) and (4) is used, or when another calculation method are used.

Tout'(x) that is obtained by correction processing unit 24 is of eight bits, and these data, T(x) and T(Xs) are sent to averaging-correction unit 25. Averaging-correction unit 25 supplies the average value of the result of linear interpolation and the input gray-level value (Tout(x)=(4·T(x)+Tout'(x))/2) when T(x)≠T(Xs) (x=4, 6, and 11 in FIG. 8(b) satisfy this relation. In other words, this is a pixel portion that is taken as a noise/error component.), and otherwise supplies Tout(x)= Tout'(x).

Averaging-correction unit 25 takes as input digital image signal T(x) and image signal Tout'(x) that is supplied from correction processing unit 24, calculates the average value of digital image signal T(x) and image signal Tout'(x) that has undergone the correction process and that has been supplied from correction processing unit 24, supplies the average value when gray-level value T(x) of the digital image signal that was received as input is not the same as starting-point gray-level T(Xs) of the linear interpolation application region, and otherwise supplies output image signal Tout'(x) from correction processing unit 24 without alteration.

Checking proceeds by the above-described processes for a pixel line for which detection results such as shown in FIG. 8(c) have been obtained. FIG. 10(a) again presents FIG. 8(c) but affixes arrows to the positions detected at that time and notes the values of the gray-level change amounts FC over the arrows.

Regarding the correction process, processing of image data that have been received from x=0 proceeds sequentially as in the detection process.

In the region from x=0 to x=7, Xs=0, FCs=10, Xe=8, and FC3e=00 (Xs<x<Xe), and as a result, the correction process (linear interpolation process) of (3) is applied. The correction process of (3) is similarly applied in the region from x=8 to 14, and the correction process of (4) is applied in the region from x=21 to 23 (FIG. 10(b)). The region indicated by the dotted line in FIG. 10(b) is a linear interpolation process region.

The results of carrying out the process of averaging-correction unit 25 after gray-level extension has been carried out in correction processing unit 24 are shown in FIG. 10(c). As shown in FIG. 10(c), in the region from x=0 to 15 in which the minimum gray-level difference is frequently seen, it can be seen that the gray-level difference has been smoothed without being influenced by changes of one-pixel one gray-level.

Figure 11:
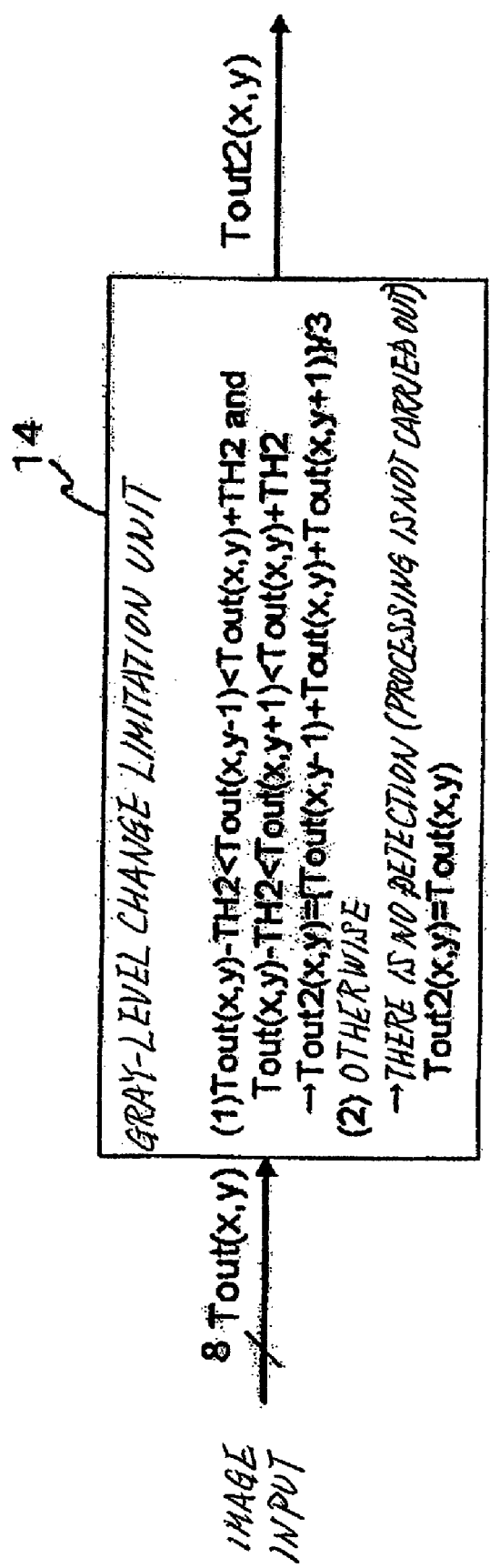
FIG. 11 is a block diagram showing an example of the configuration of the gray-level-change limitation unit provided in the image processor shown in FIG. 6.
Figure 12:
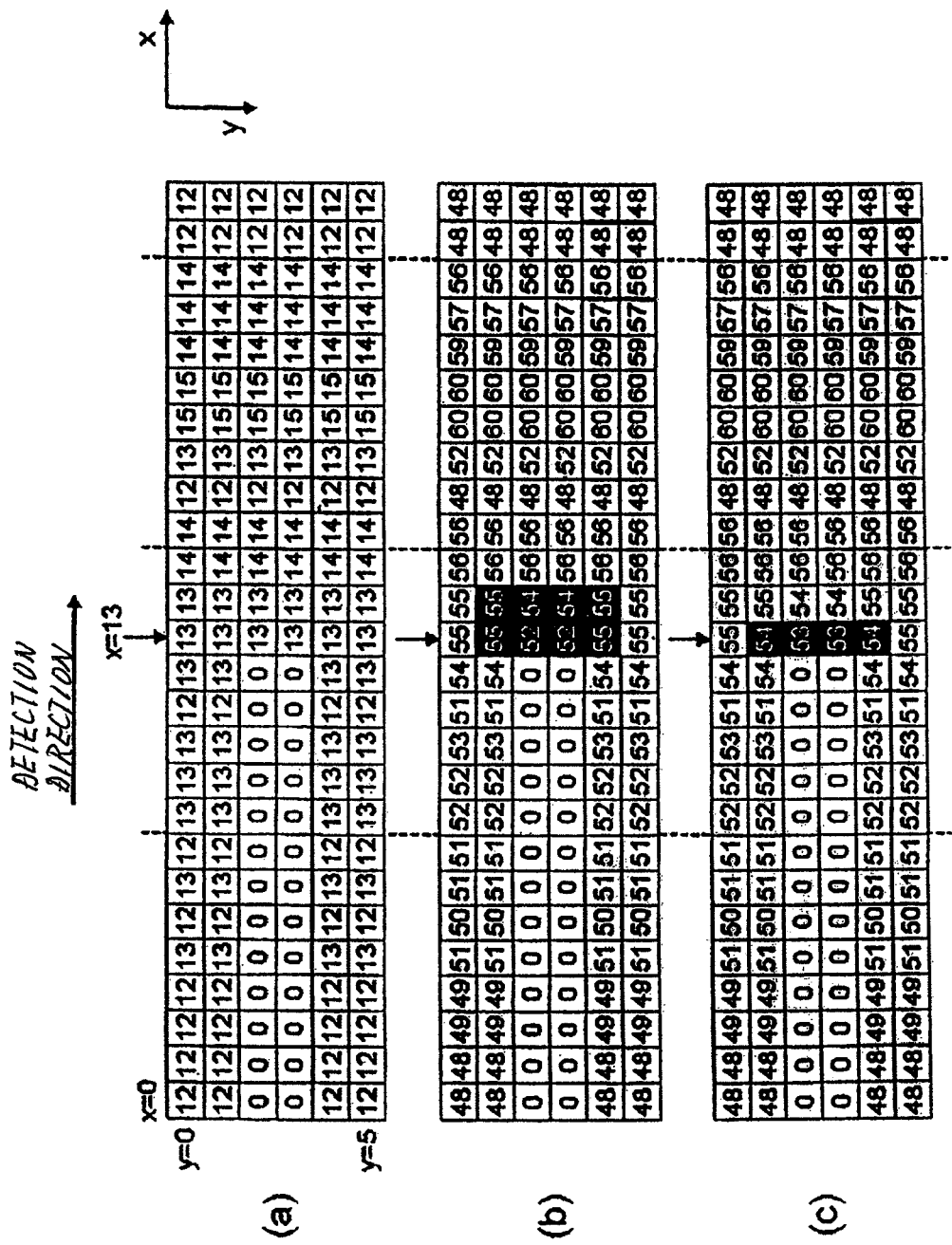
FIG. 12 is a schematic view showing the process of the gray-level-change limitation unit provided in the image processor shown in FIG. 6.

Explanation next regards the configuration and operation of gray-level-change limitation unit 14 shown in FIG. 6 using FIGS. 11 and 12.

FIG. 11 is a schematic view showing the processing content of gray-level-change limitation unit 14 shown in FIG. 6, and FIG. 12 is a view for explaining the details of the gray-level extension/correction process when a particular two-dimensional pixel line that includes FIG. 8(a) is received as input in gray-level-change limitation unit 14 and the correction results in FIG. 10 are obtained.

As shown in FIG. 11, the gray-level change limitation process compares the gray-level values of the image signal following the gray-level extension process in the y-direction when the detection process has been carried out in the x-direction, and when the gray-level change is smaller than the gray-level difference to which the minimum gray-level difference preceding the gray-level extension process is converted after the gray-level extension process, carries out a 1×3 spatial averaging process to limit these gray-level changes to within prescribed values.

More specifically:

(1) When Tout(x, y)−TH2<Tout(x, y−1)<Tout(X, y)+TH2, and moreover, Tout(x, y)−TH2<Tout(x, y+1)<Tout(x, y)+TH2:

Tout2(x, y)={Tout(x, y−1)+Tout(x, y)+Tout(x, y+1)}/3

(2) Otherwise, Tout2(x, y)=Tout(x, y)

Here, when the gray-level is extended two bits, a gray-level difference 1 of six-bit data corresponds to 2^2=4 in eight-bit data, whereby TH2=4.

Explanation next regards a specific example of the results when the above-described process is applied to image data.

The image shown in FIG. 12(a) is applied as input, and FIG. 12(b) is the result of carrying out the detection/correction processes. In FIG. 12(b), the portion shown in black of the region of x=13 and 14 satisfies the above-described condition (1) and the averaging process is implemented. FIG. 12(c) is the result of carrying out the gray-level change limitation process upon the image shown in FIG. 12(b). It can here be seen that the gray-level change of x=13 has been limited to within 1 by the averaging process.

The image processor of the present exemplary embodiment therefore, by the provision of: detection unit 11 for detecting linear interpolation application regions, extension-correction unit 12 for carrying out gray-level extension based on the detection results, and gray-level-change limitation unit 14 for limiting gray-level changes in a second direction that differs from the direction in which detection unit 11 carried out the detection process to within prescribed values, realizes an appropriate gray-level extension process at low cost.

Although the present exemplary embodiment determines detected position data and gray-level change amount FC of the detected positions in detection unit 11 and carries out a correction process in extension-correction unit 12 based on these data, the processes executed in detection unit 11 and extension-correction unit 12 may be distributed in any way. For example, processing up to the process of generating corrected bits (in the present exemplary embodiment, the values obtained by subtracting the input image gray-levels from the result of the process carried out in correction processing unit 12) may be executed in detection unit 11, and only the process of gray-level addition may be executed in extension-correction unit 12. Similarly, the processing of correction processing unit 12 and gray-level-change limitation unit 14 may also be distributed in any way and executed.

As described in the foregoing explanation, even when cost constraints prevent the adoption of a frame buffer, the image processor of the present exemplary embodiment can realize a more suitable gray-level extension process by using a relatively inexpensive line buffer.

Second Exemplary Embodiment

Explanation next regards the image processor of the second exemplary embodiment of the present invention.

Figure 13:
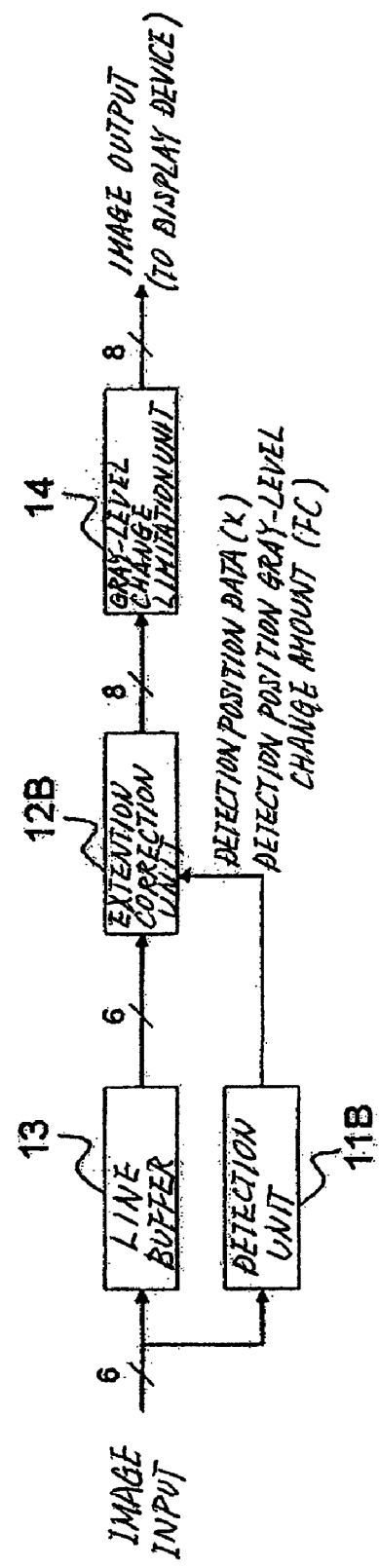
FIG. 13 is a block diagram showing the configuration of the image processor that is the second exemplary embodiment of the present invention.

FIG. 13 is a block diagram showing the configuration of the second exemplary embodiment of the image processor of the present invention.

The image processor of the second exemplary embodiment differs from the image processor of the first exemplary embodiment shown in FIG. 6 regarding the processes of the detection unit and correction processing unit.

As shown in FIG. 13, detection unit 11B and correction processing unit 12B included in the image processor of the second exemplary embodiment are of a configuration that lacks averaging-correction unit 25 when the process for preventing the detection of noise/error components as false contours that was described in the first exemplary embodiment is not applied.

Figure 14:
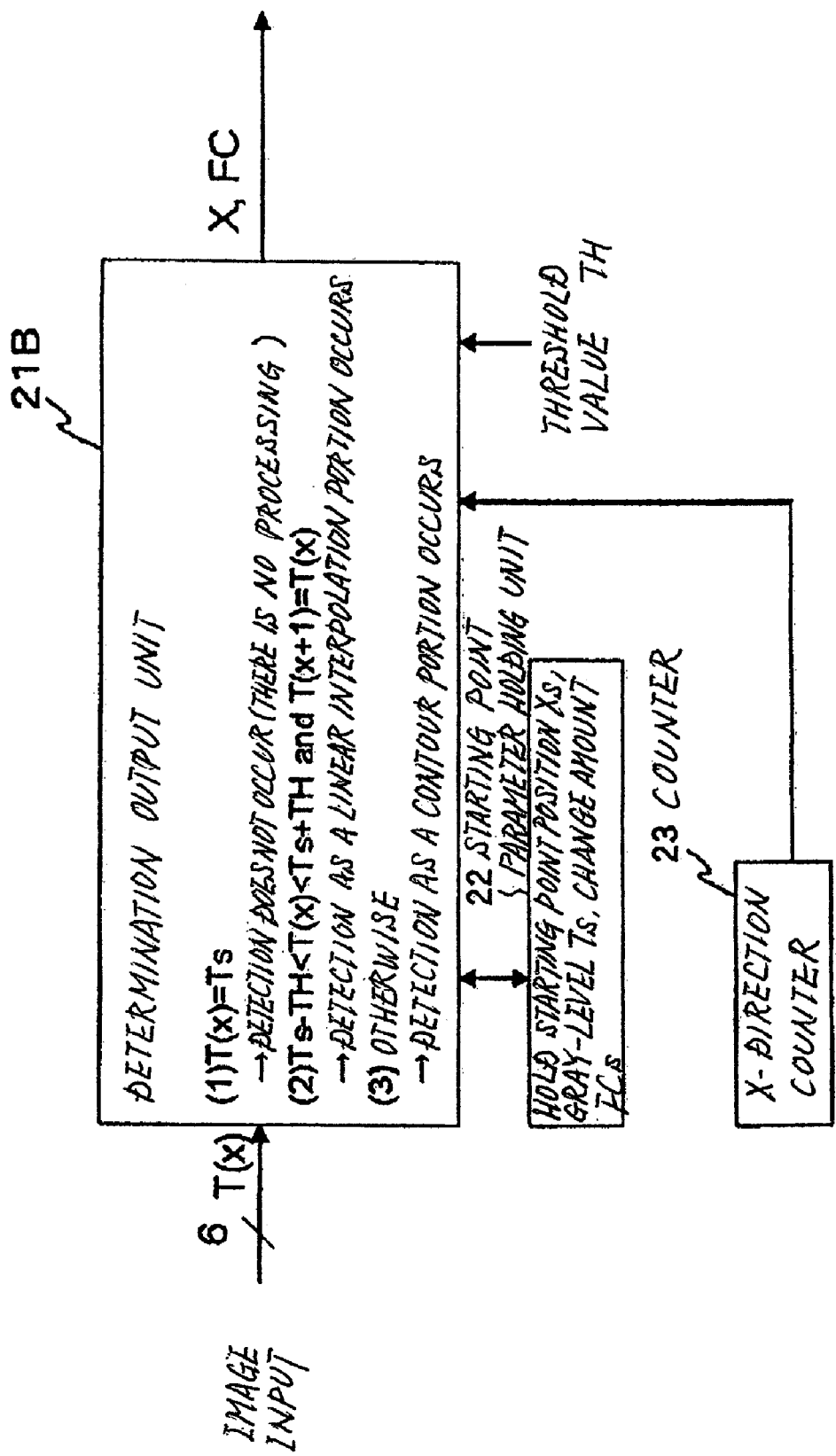
FIG. 14 is a block diagram showing an example of the configuration of the detection unit that is provided in the image processor shown in FIG. 13.
Figure 15:
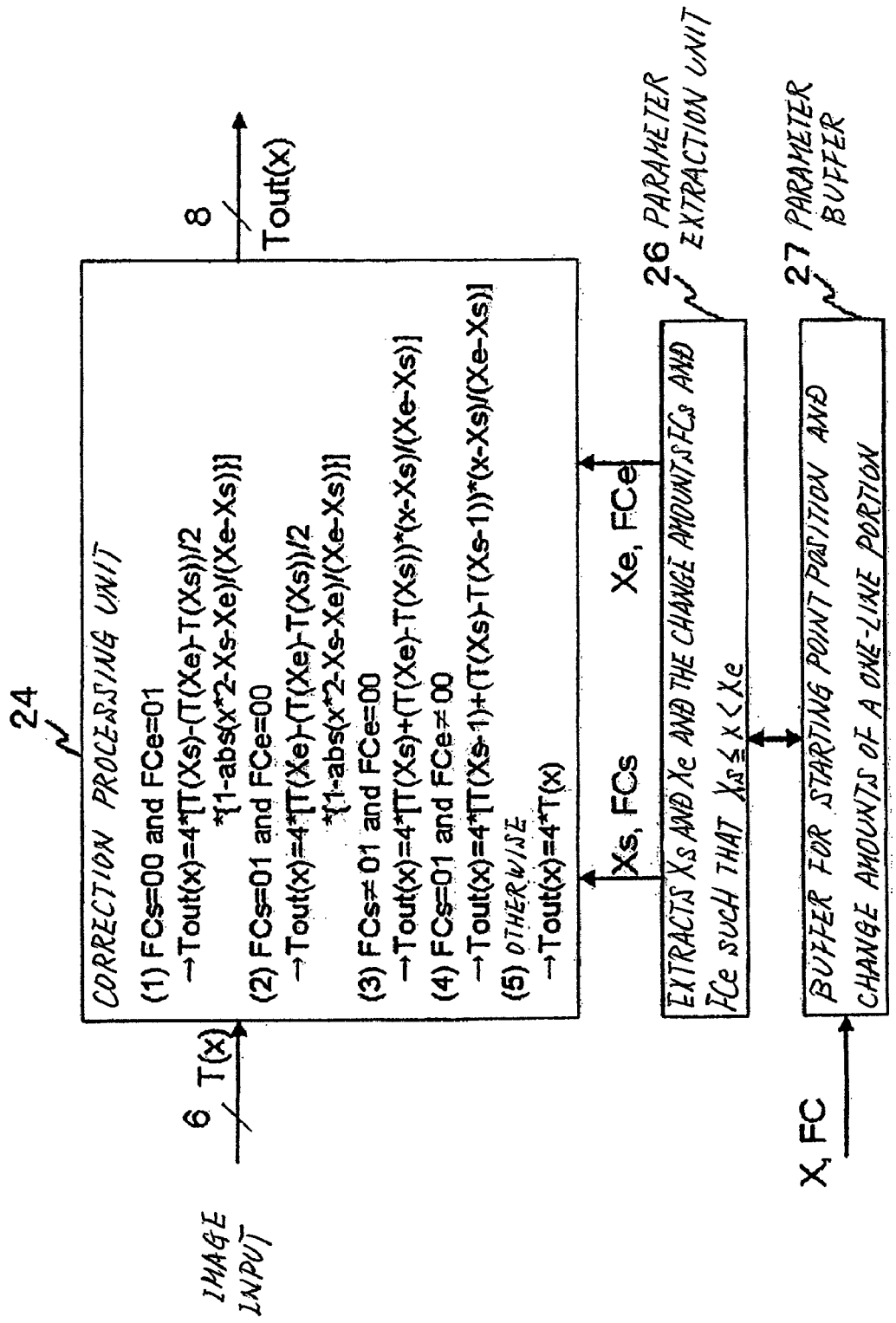
FIG. 15 is a block diagram showing an example of the extension-correction unit provided in the image processor shown in FIG. 13.

FIG. 14 is a block diagram showing an example of the configuration of the detection unit that is provided in the image processor of the second exemplary embodiment, and FIG. 15 is a block diagram showing an example of the configuration of the correction processing unit that is provided in the image processor of the second exemplary embodiment.

In detection unit 11B shown in FIG. 14, the processing of determination output unit 21B differs from that of determination output unit 21 included in the detection unit of the first exemplary embodiment shown in FIG. 7.

Determination output unit 21B does not take a detected gray-level change as a detected point only when (1) T(x)=Ts (when the starting-point gray-level and the gray-level of the input image are the same).

Correction processing unit 12B shown in FIG. 15 differs from correction processing unit 12 of the first exemplary embodiment shown in FIG. 9 in that it lacks averaging-correction unit 25.

Despite alterations of the detection unit and correction processing unit in the image processor of the present exemplary embodiment, the processing of gray-level-change limitation unit 14 is unaltered and the effect of the gray-level change limitation process can therefore be obtained. As a result, a more appropriate gray-level extension process is realized at low cost.

Third Exemplary Embodiment

Explanation next regards the third exemplary embodiment of the present invention.

Although examples were shown in the first and second exemplary embodiments in which the image processing method of the present invention was applied to an image processor, the third exemplary embodiment is an example in which the image processing shown in the first and second exemplary embodiments is applied to a display device.

Figure 16:
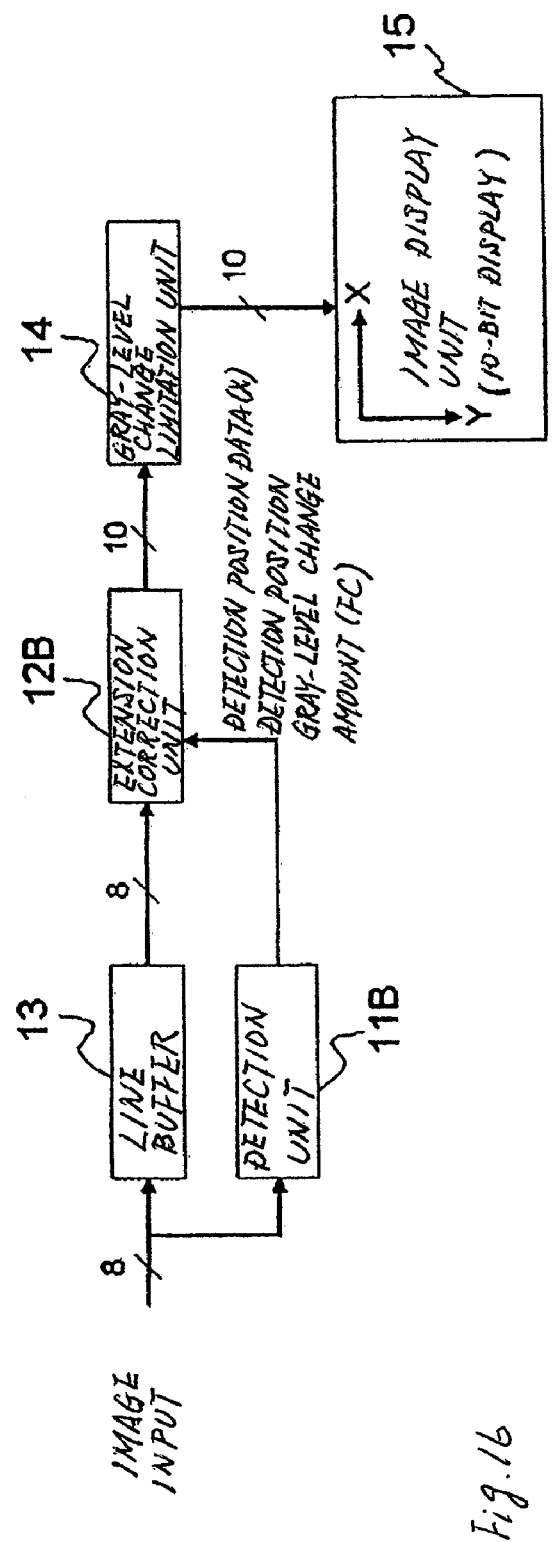
FIG. 16 is a block diagram showing the configuration of the display device that is the third exemplary embodiment of the present invention.

FIG. 16 is a block diagram showing an example of the configuration of the display device of the present invention.

The display device of the third exemplary embodiment is of a configuration that includes: detection unit 11B for carrying out a detection process upon raster image composed of eight-bit image data that is transmitted from a information processor such as a computer; line buffer 13 for storing a one-line portion of image data; extension-correction unit 12B for subjecting image data supplied from line buffer 13 to gray-level extension to ten bits based on detection position data X and gray-level change data FC transmitted from detection unit 11B; gray-level-change limitation unit 14 for implementing a gray-level change limitation process upon image data that have been supplied as output from extension-correction unit 12B; and image display unit 15 that is capable of ten-bit display.

Other than the addition of image display unit 15, the display device of the third exemplary embodiment is of the same configuration as the image processor of the second exemplary embodiment shown in FIG. 13. In addition, in the display device of the third exemplary embodiment, the image processing unit is made up from detection unit 11B, extension-correction unit 12B, line buffer 13, and gray-level-change limitation unit 14.

Although an example was described in which eight-bit image data undergo gray-level extension to ten bits in the present exemplary embodiment, the processing method does not differ from a case in which six-bit image data undergo a gray-level extension to eight bits.

In addition, because a display device sequentially processes image data for each line in the main scanning direction, the line buffer is preferably of a buffer size that can store the image data of a one-line portion in the X direction of the image display unit. Image display unit 15 may be of any type such as LCD, PDP, EL, and CRT that can display image data.

Even when the number of bits of image data that have been received as input is less than the number of bits that can be displayed on image display unit 15, an appropriate gray-level extension process can be carried out, the occurrence of false contours can be suppressed, and a display of superior image quality can be obtained.

Fourth Exemplary Embodiment

Explanation next regards the fourth exemplary embodiment of the present invention using the accompanying figures.

Figure 17:
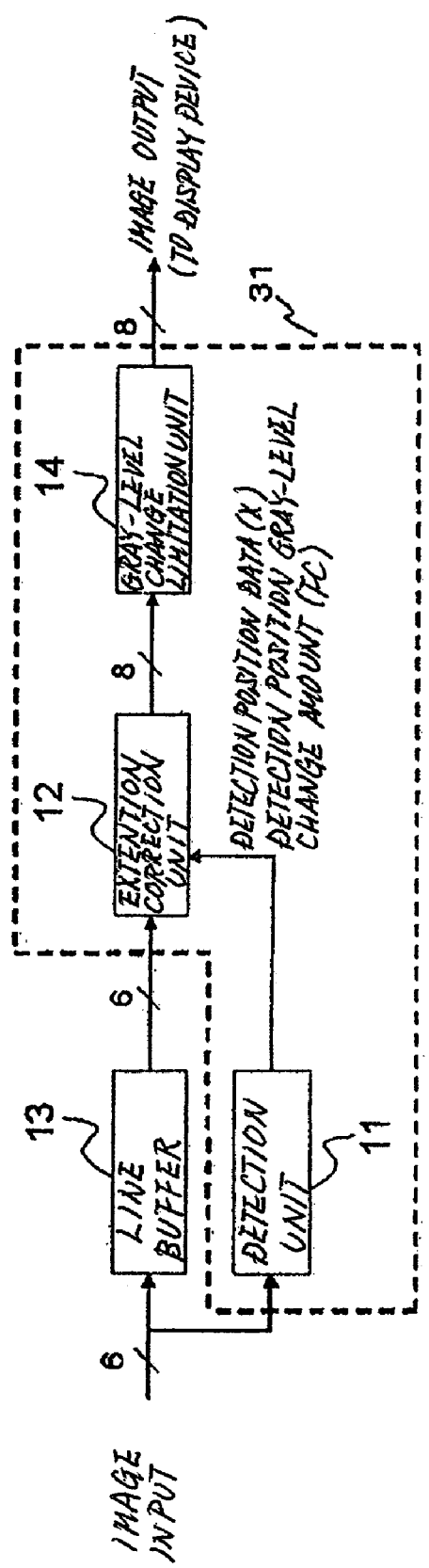
FIG. 17 is a block diagram showing the configuration of the information processor that is the fourth exemplary embodiment of the present invention.

The fourth exemplary embodiment is an example that uses an information processor to realize the image processing method of the present invention. In other words, as shown in FIG. 17, the processes of detection unit 11, extension-correction unit 12, and gray-level-change limitation unit 14 shown in the first exemplary embodiment are executed by a computer (CPU 31).

FIGS. 18, 19, 20, and 21 are flow charts showing the procedures of the image processing method of the present invention. FIGS. 18-21 are examples in which the processes of the image processor of the first exemplary embodiment are executed by CPU 31.

The image processing method of the present invention carries out a detection process upon a six-bit raster image that is received as input and then carries out an extension process to eight bits based on the detection results. The process from Step S2 to Step S12 shown in FIG. 18 corresponds to the process of detection unit 11 shown in the first exemplary embodiment (first image process), and the process from Step S13 to Step S29 shown in FIGS. 19 and 20 corresponds to the process of extension-correction unit 12 shown in the first exemplary embodiment (second image process). In addition, the process from Step S30 to Step S33 shown in FIG. 21 corresponds to the process of gray-level-change limitation unit 14 shown in the first exemplary embodiment (third image process).

These processes are executed by CPU 31 in accordance with a program that is stored in a ROM or recording medium (not shown) provided in a computer to realize the functions of detection unit 11, extension-correction unit 12, and gray-level-change limitation unit 14 described hereinabove.

Figure 18:
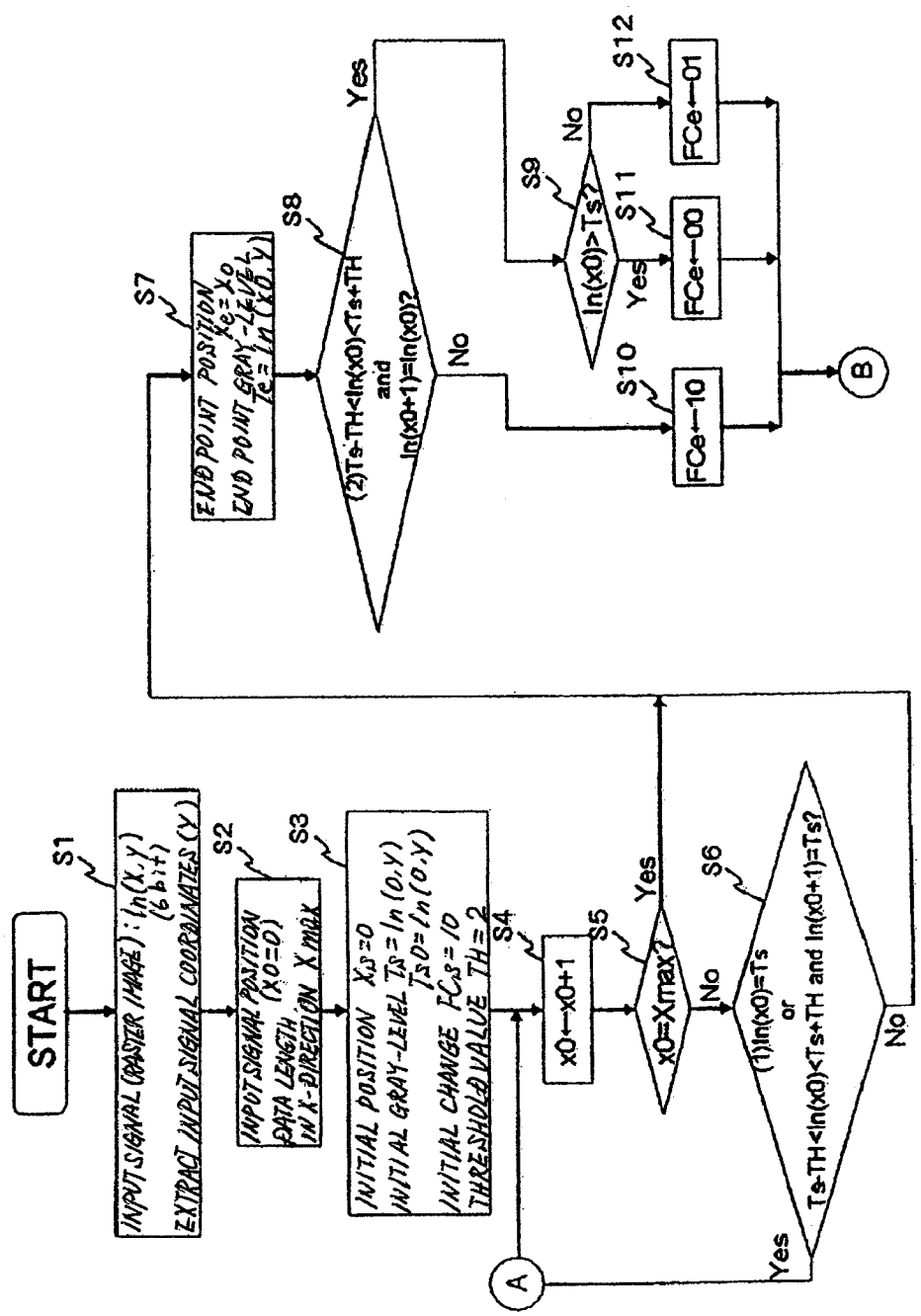
FIG. 18 is a flow chart showing the procedure of the image processing method of the present invention.

Explanation first regards the first image process using FIG. 18.

As shown in FIG. 18, when image data In (six-bit) of raster image 1 are applied as input to a computer, CPU 31 extracts information indicating the pixels to which the image signal that has been received as input applies (i.e., the y-value of the pixels) (Step S1). Here, In( ) indicates the gray-level value.

In order to carry out the detection/correction processes upon the image data of the relevant line based on the y-coordinates of the pixels, CPU 31 initializes input signal position x0=0 and acquires the data length Xmax in the X-direction that has been determined in advance (Step S2).

Upon starting the detection process, CPU 31 sets starting-point position Xs=0, starting-point preceding position Xs0=0, starting-point gray-level Ts=ln(0, y), starting-point change FCs=10, and threshold value TH=2 (Step S3).

Having set the initial conditions, the detection process proceeds as follows:

CPU 31 first increments the input signal position x0 by "1" (Step S4).

Next, if the value of x0 is equal to Xmax, the gray-level change detection process is terminated, and processing transitions to Step S 7. Otherwise, the process advances to the gray-level change detection process (Step S5).

(Process for Detecting Gray-Level Change)

When gray-level data ln(x0, y) of position x0 is equal to starting-point gray-level Ts (the same gray-level continues), or when Ts−TH<ln(x0, y)<Ts+TH, and moreover, ln(x0+1, y)=Ts (change of one-pixel, one gray-level), CPU 31 next returns to the process of Step S4 and continues the detection of gray-level changes. CPU 31 otherwise takes the point as a gray-level change point and transitions to the process of Step S7 (Step S6).

CPU 31 next holds the values of end-point position Xe=x0 and end-point gray-level Te=ln(x0, y) (Step S7).

(Process for Setting Amount of Change of Detected Points)

Next, when Ts−TH<ln(x0, y)<Ts+TH, and moreover, ln(x0+1, y)=ln(x0, y), CPU 31 proceeds to the process of Step S9 (determination of whether this is a linear interpolation application regions), and if not, proceeds to the process of Step S10 (Step S8).

In Step S9, ln(x0, y) and Ts are compared, and increase or decrease of the gray-level change in the linear interpolation application region is determined. If the gray-level change is increase, the process moves to Step S11, and if the gray-level change is decrease, the process moves to Step S12.

In Step S10, end-point change Te is set to 10 (not a linear interpolation application region).

In Step S11, end-point Te is set to 00 (this being a linear interpolation application region in which the gray-level change is increase).

In Step S12, end-point Te is set to 01 (this being a linear interpolation application region in which the gray-level change is decrease).

CPU 31 then moves to the gray-level extension process, which is the second image process.

Figure 19:
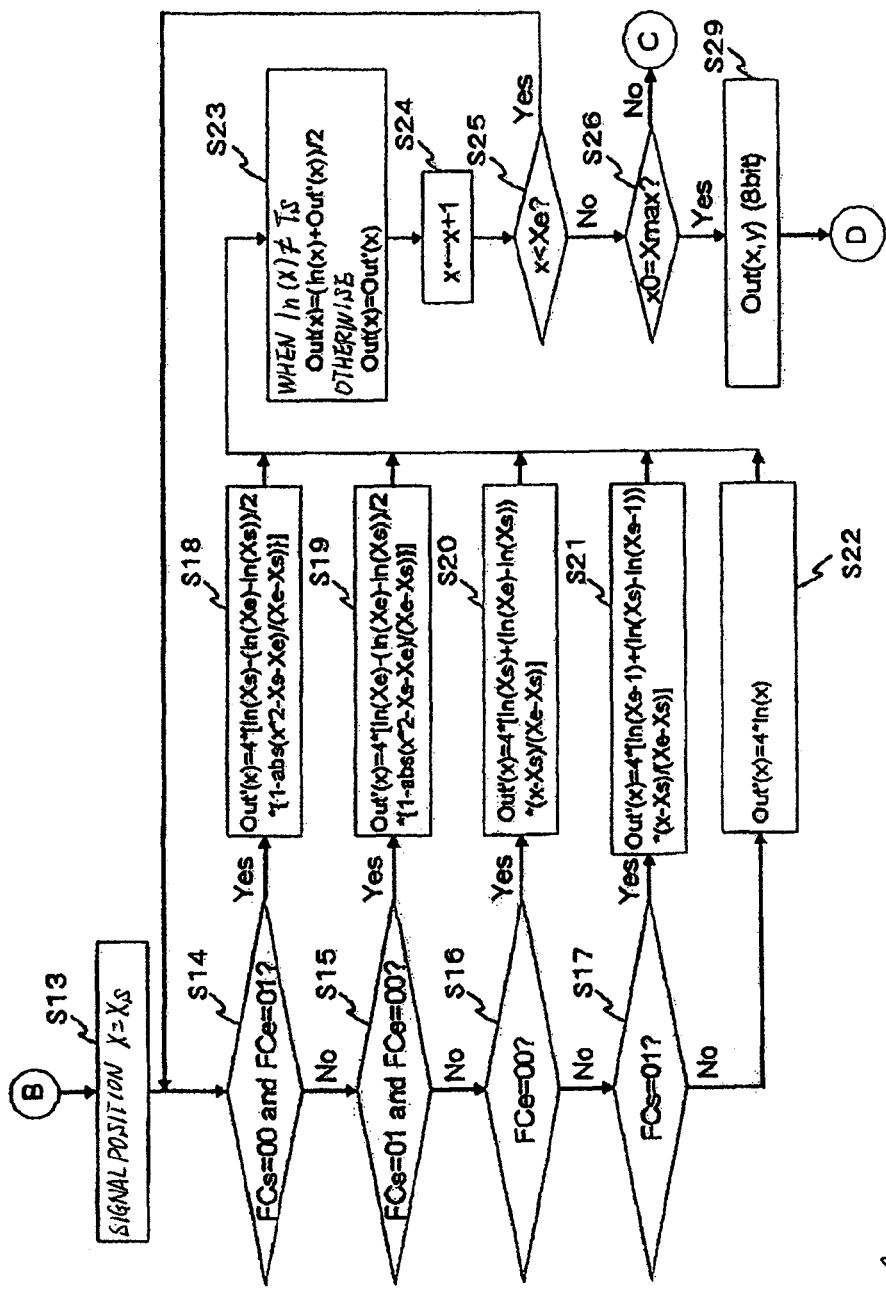
FIG. 19 is a flow chart showing the procedure of the image processing method of the present invention.
Figure 20:
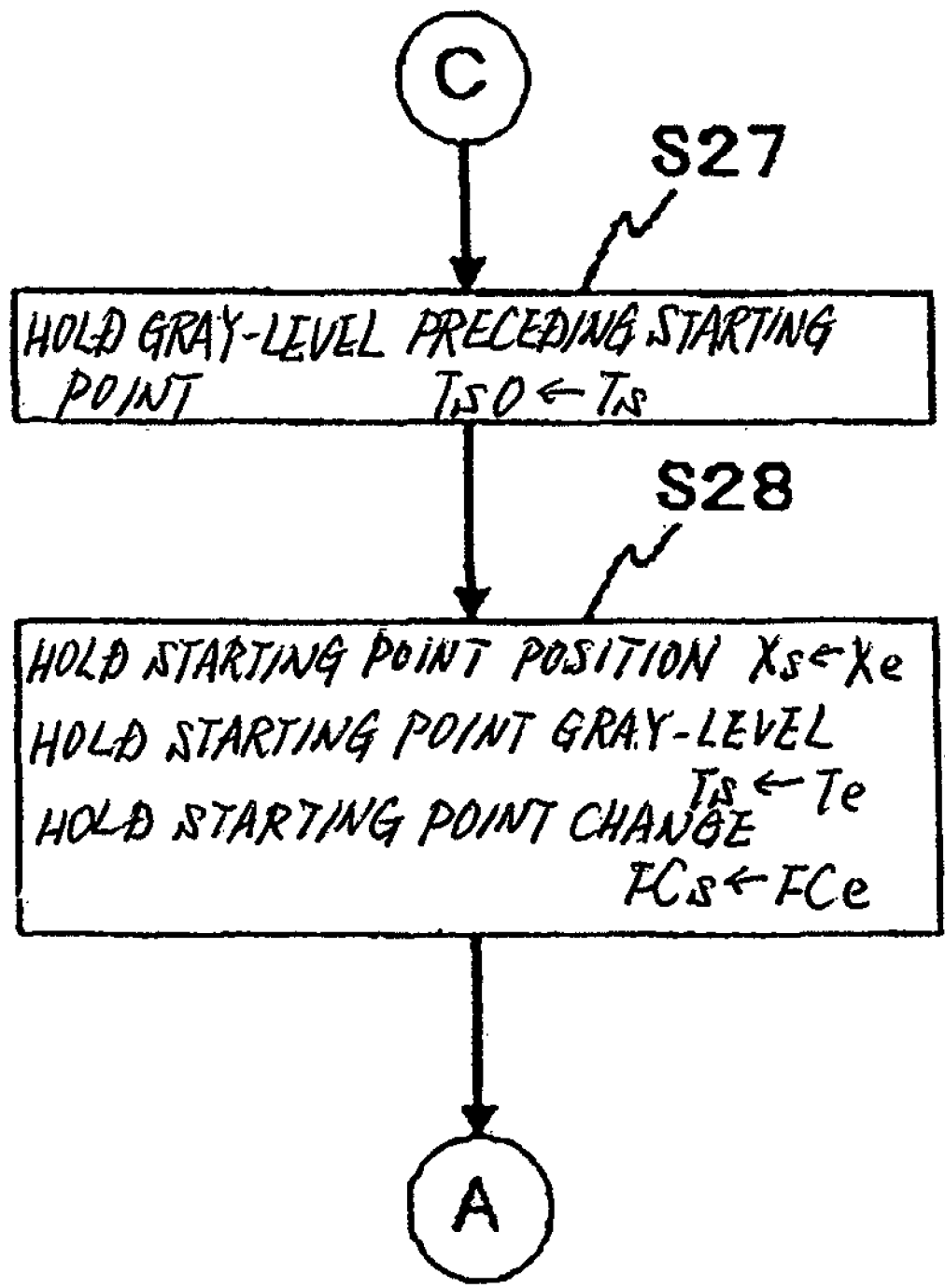
FIG. 20 is a flow chart showing the procedure of the image processing method of the present invention.

Explanation next regards the second image process using FIGS. 19 and 20.

As shown in FIG. 19, CPU 31 sets the extension correction signal position x to Xs (Step S13).

(Process for Determining the Gray-Level Extension Content)

CPU 31 next determines the gray-level extension process to be applied based on the values of starting-point gray-level change FCs and end-point gray-level change FCe (Steps S14 to S17). The procedure for determining the content of the gray-level extension process is as shown in (1)-(5) below:

(1) If FCs=00, and moreover, FCe=01, the process of Step S18 is executed (Step S14).

(2) If the above-described conditions of (1) are not satisfied, FCs=01, and moreover, FCe=00, the process of Step S19 is executed (Step S15).

(3) If the above-described conditions of (2) are not satisfied, and FCe=00, the process of Step S20 is executed (Step S16).

(4) If the above-described conditions of (3) are not satisfied, and FCs=01, the process of Step S21 is executed (Step S17).

(5) If the above-described conditions of (4) are not satisfied, the process of Step S22 is executed (Step S17).

(Gray-Level Extension Process)

CPU 31 uses starting-point position Xs, starting-point gray-level Ts, end-point position Xe, end-point gray-level Te, extension correction signal position x, and the image signal that has been received as input to execute the gray-level extension process of any one of the processes (1) to (5) shown below in accordance with the selection results of Steps S14 to S17.

(1) Step S18:

$$\text{Out}'(x)=4\cdot[\ln(Xs)-(\ln(Xe)-\ln(Xs))/2\cdot\{1-abs(x\cdot 2-Xs-Xe)/(Xe-Xs)\}]$$

(2) Step S19:

$$\text{Out}'(x)=4\cdot[\ln(Xe)-(\ln(Xe)-\ln(Xs))/2\cdot\{1-abs(x\cdot 2-Xs-Xe)/(Xe-Xs)\}]$$

(3) Step S20:

$$\text{Out}'(x)=4\cdot[\ln(Xs)+(\ln(Xe)-\ln(Xs))\cdot(x-Xs)/(Xe-Xs)]$$

(4) Step S21:

$$\text{Out}'(x)=4\cdot[\ln(Xs0)+(\ln(Xs)-\ln(Xs0))\cdot(x-Xs)/(Xe-Xs)]$$

(5) Step S22 (linear interpolation process is not carried out):

$$\text{Out}'(x)=4\cdot\ln(x)$$

(Averaging Correction Process)

CPU 31 next compares ln(x, y) and Ts and executes one of the processes shown below (Step S23):

When ln(x)≠Ts: Out(x)=(ln(x)+Out'(x))/2

In other cases: Out(x)=Out'(x)

CPU 31 next increments the value of x by 1 (Step S24).

When x<Xe, the gray-level extension process is repeated using the same parameters Xs. Ts. Xe. Te, and the process therefore returns to Step S14. When x≧Xe, the gray-level extension process ends (Step S25).

Then, when the values of x0 and Xmax are compared (Step S26) and x0=Xmax, CPU 31 carries out the gray-level extension process upon all input signals ln(x, y) of one line from x=0 to Xmax and therefore proceeds to the process of Step S29. CPU 31 otherwise continues the processing of the remaining input signals and therefore proceeds to the process of Step S27.

In Step S27, CPU 31 substitutes Xs for position Xs0 preceding the starting-point.

CPU 31 then substitutes Xe for starting-point position Xs, substitutes Te for starting-point gray-level Ts, and substitutes FCe for starting-point change FCs (Step S28), and then returns to the process of Step S4 to again start the detection process.

In Step S29, output image data Out(x, y) (eight bits) are sent to the third image process.

Figure 21:
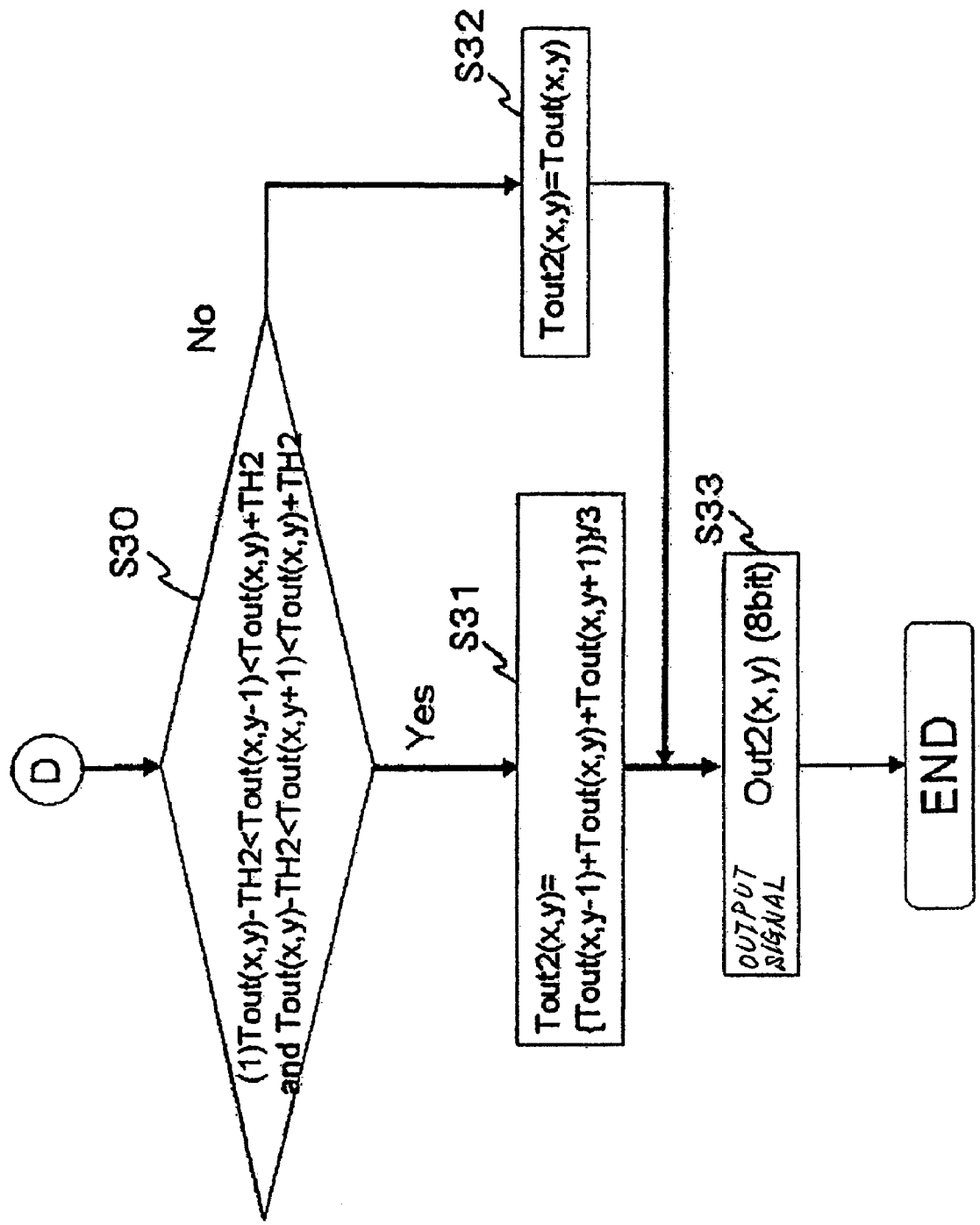
FIG. 21 is a flow chart showing the procedure of the image processing method of the present invention.

Explanation next regards the third image process using FIG. 21.

As shown in FIG. 21, CPU 31 first determines whether the condition holds that Out(x, y)−TH2<Out(x, y−1)<Out(x, y)+TH2, and moreover, Out(x, y)−TH2<Out(x, y+1)<Out(x, y)+TH2 (when the gray-level change is smaller than TH2) (Step S30). If the gray-level change is smaller than TH2, CPU 31 then executes the process of Step S31, and if not, executes the process of Step S32.

CPU 31 executes one of the following processes in accordance with the processing results of Step S30:
(1) Step S31:

$$Out2(x,y)=\{Out(x,y-1)+Out(x,y)+Out(x,y+1)\}/3$$

(2) Step S32:

$$Out2(x,y)=Out(x,y)$$

Finally, CPU 31 supplies as output image data Out2(x, y) (8 bits) that was found in the above-described processing (Step S33).

As described in the foregoing explanation, the execution of the processing of detection unit 11, extension-correction unit 12, and gray-level-change limitation unit 14 shown in the first exemplary embodiment by means of a computer enables image processing similar to the image processor of the first exemplary embodiment without the use of special hardware.

The flow charts of FIGS. 18 to 21 show processes of the image processor of the first exemplary embodiment, but the processes of the image processor of the second exemplary embodiment can also be executed using a computer as described hereinabove.

In the fourth exemplary embodiment, an example was described in which the functions of the image processor of the first exemplary embodiment were realized using a computer, but the processes of the above-described image detection device, gray-level extension device, and gray-level change limitation device can also obviously be realized by a computer.

Although examples were described in the first to fourth exemplary embodiments described hereinabove in which the number of bits of image data that are increased by a gray-level extension is fixed, the number of bits that are increased after gray-level extension can be applied to any number.

The above-described first to fourth exemplary embodiments show suitable examples of the present invention, but the present invention is not limited to the configuration shown in the first to fourth exemplary embodiments. For example, the amount of increase of bits of image data by the gray-level extension process need not be the same for each color. When image data are composed of the three systems RGB and the R data are of five bits, the G data are of six bits, and the B data are of five bits, the R data and B data can be extended three bits and the G data extended 2 bits to produce eight bits for each of the RGB image data.

A configuration is also possible that increases the number of bits of only some of the colors of the RGB image data. Raster images are not necessarily color images composed of image data of a plurality of colors, but can also be monochrome images. The present invention is therefore open to various modifications.

The invention claimed is:

1. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that limits, to within prescribed values, gray-level changes in a second direction that differs from the direction in which said detection unit carried out the detection process for regions in which said gray-level extension process has been implemented,
wherein said gray-level-change limitation unit, as a process for limiting said gray-level changes to within prescribed values, carries out a spatial averaging process that takes, as the gray-level value of the pixel of interest, the average value of the gray-level value of the pixel that is the object of processing and the gray-level values of pixels that are adjacent in said second direction.

2. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that compares gray-level values of image signals before said gray-level extension process and after said gray-level extension process, and when gray-level change in a second direction that differs from the direction in which the detection process was carried out in said detection unit before said gray-level extension process is within a fixed range, and moreover, said gray-level change in said second direction after said gray-level extension process is greater than gray-level change in said second direction before said gray-level extension process, limiting the gray-level changes to within prescribed values,
wherein said gray-level-change limitation unit, as a process for limiting said gray-level change to within prescribed values, carries out clipping of gray-level values such that gray-level differences with pixels in said second direction are within said prescribed values.

3. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that compares each of gray-level values of image signals after said gray-level extension process with respect to a second direction that differs from the direction in which said detection unit carried out the detection process, and when gray-level change with said linear interpolation application region is smaller than a gray-level difference in which a minimum gray-level difference before said gray-level extension process is converted to a value after said gray-level extension process, limiting the gray-level change to within prescribed values,
wherein said gray-level-change limitation unit, as a process for limiting said gray-level change to within prescribed values, carries out clipping of gray-level values such that gray-level differences with pixels in said second direction are within said prescribed values.

4. The image processor according to claim 1, wherein said gray-level-change limitation unit, as a process for limiting said gray-level change to within prescribed values, carries out clipping of gray-level values such that gray-level differences with pixels in said second direction are within said prescribed values.

5. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that limits, to within prescribed values, gray-level changes in a second direction that differs from the direction in which said detection unit carried out the detection process for regions in which said gray-level extension process has been implemented,
wherein "within said prescribed values" is within a range of minimum gray-level differences after said gray-level extension process.

6. A display device comprising:
an image processing unit provided with:
a detection unit that sequentially scans pixel lines of an image signal that is received as input to both detect linear interpolation application regions, which are regions in which gray-level changes are to be smoothed for each line of said image signal, and that, when a gray-level change within a certain fixed range is detected, when the gray-level value of the position following the position in which this gray-level change was detected is the same as the gray-level value of the position before the position at which said gray-level change was detected, makes the gray-level value of the pixel at which said gray-level change was detected the gray-level value of the pixels at positions before and after that pixel;
an extension-correction unit that carries out a gray-level extension process upon said linear interpolation application regions that have been detected in said detection unit; and
a gray-level-change limitation unit that limits, to within prescribed values, gray-level change with respect to a second direction that differs from the direction in which said detection unit carried out the detection process, for regions in which said gray-level extension process has been implemented; and
a display unit that displays images based on the output signal of said image processing unit.

7. An image processing method comprising steps of:
sequentially scanning pixel lines of an image signal that has been received as input to detect linear interpolation application regions, which are regions in which gray-level changes are to be smoothed, for each line of said image signal;
carrying out a gray-level extension process upon said linear interpolation application regions that have been detected; and
limiting, to within prescribed values, gray-level changes in a second direction that differs from the direction in which said detection process was carried out of said linear interpolation application regions for regions in which said gray-level extension process was carried out,
wherein limiting said gray-level changes to within prescribed values includes carrying out a spatial averaging process that takes, as a gray-level value of a pixel of interest, an average value of a gray-level value of a pixel that is an object of processing and the gray-level values of pixels that are adjacent in said second direction.

8. A non-transitory computer readable recording medium storing a program for causing a computer to execute steps of:
sequentially scanning pixel lines of an image signal that has been received as input to detect linear interpolation application regions, which are regions in which gray-level changes are to be smoothed, for each line of said image signal;
carrying out a gray-level extension process upon said linear interpolation application regions that have been detected; and
limiting, to within prescribed values, gray-level changes in a second direction that differs from the direction in which said detection process was carried out of said linear interpolation application regions for regions in which said gray-level extension process was carried out,
wherein limiting said gray-level changes to within prescribed values includes carrying out a spatial averaging process that takes, as a gray-level value of a pixel of interest, an average value of a gray-level value of a pixel that is an object of processing and the gray-level values of pixels that are adjacent in said second direction.

9. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that compares gray-level values of image signals before said gray-level extension process and after said gray-level extension process, and when gray-level change in a second direction that differs from the direction in which the detection process was carried out in said detection unit before said gray-level extension process is within a fixed range, and moreover, said gray-level change in said second direction after said gray-level extension process is greater than gray-level change in said second direction before said gray-level extension process, limiting the gray-level changes to within prescribed values,
wherein said gray-level-change limitation unit, as a process for limiting said gray-level changes to within prescribed values, carries out a spatial averaging process that takes, as the gray-level value of the pixel of interest, the average value of the gray-level value of the pixel that is the object of processing and the gray-level values of pixels that are adjacent in said second direction.

10. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that compares gray-level values of image signals before said gray-level extension process and after said gray-level extension process, and when gray-level change in a second direction that differs from the direction in which the detection process was carried out in said detection unit before said gray-level extension process is within a fixed range, and moreover, said gray-level change in said second direction after said gray-level extension process is greater than gray-level change in said second direction before said gray-level extension process, limiting the gray-level changes to within prescribed values, wherein "within said prescribed values" is within a range of minimum gray-level differences after said gray-level extension process.

11. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that compares each of gray-level values of image signals after said gray-level extension process with respect to a second direction that differs from the direction in which said detection unit carried out the detection process, and when gray-level change with said linear interpolation application region is smaller than a gray-level difference in which a minimum gray-level difference before said gray-level extension process is converted to a value after said gray-level extension process, limiting the gray-level change to within prescribed values,
wherein said gray-level-change limitation unit, as a process for limiting said gray-level changes to within prescribed values, carries out a spatial averaging process that takes, as the gray-level value of the pixel of interest, the average value of the gray-level value of the pixel that is the object of processing and the gray-level values of pixels that are adjacent in said second direction.

12. An image processor comprising:
a detection unit that sequentially scans pixel lines of an image signal that is received as input to detect linear interpolation application regions, which are regions in which gray-level changes are to be smoothed for each line of said image signal;
an extension-correction unit that carries out a gray-level extension process upon said linear interpolation application regions that have been detected in said detection unit; and
a gray-level-change limitation unit that compares each of gray-level values of image signals after said gray-level extension process with respect to a second direction that differs from the direction in which said detection unit carried out the detection process, and when gray-level change with said linear interpolation application region is smaller than a gray-level difference in which a minimum gray-level difference before said gray-level extension process is converted to a value after said gray-level extension process, limiting the gray-level change to within prescribed values, wherein "within said prescribed values" is within a range of minimum gray-level differences after said gray level extension process.

13. The image processor according to claim 1, further comprising a line buffer that stores image data corresponding to at least one scanned pixel line,
wherein the extension-correction unit is configured to carry out the gray-level extension process upon said linear interpolation application regions in the image data stored in the line buffer that have been detected in said detection unit.

14. The image processor according to claim 2, further comprising a line buffer that stores image data corresponding to at least one scanned pixel line,
wherein the extension-correction unit is configured to carry out the gray-level extension process upon said linear interpolation application regions in the image data stored in the line buffer that have been detected in said detection unit.

15. The image processor according to claim 3, further comprising a line buffer that stores image data corresponding to at least one scanned pixel line,
wherein the extension-correction unit is configured to carry out the gray-level extension process upon said linear interpolation application regions in the image data stored in the line buffer that have been detected in said detection unit.

16. The image processing method according to claim 7, further comprising storing image data corresponding to at least one scanned pixel line,
wherein the gray-level extension process is carried out upon said linear interpolation application regions that have been detected in the stored image data.

17. The non-transitory computer readable recording medium according to claim 8, wherein the stored program further causes the computer to execute a step of storing image data corresponding to at least one scanned pixel line,
wherein the gray-level extension process is carried out upon said linear interpolation application regions that have been detected in the stored image data.

* * * * *